US009467658B2

(12) United States Patent
Candelore

(10) Patent No.: US 9,467,658 B2
(45) Date of Patent: *Oct. 11, 2016

(54) METHOD AND APPARATUS FOR PROTECTING THE TRANSFER OF DATA

(71) Applicants: SONY CORPORATION, Tokyo (JP); SONY ELECTRONICS INC., Park Ridge, NJ (US)

(72) Inventor: Brant L. Candelore, San Diego, CA (US)

(73) Assignees: SONY CORPORATION, Tokyo (JP); SONY ELECTRONICS INC., Park Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/793,889

(22) Filed: Jul. 8, 2015

(65) Prior Publication Data

US 2015/0312525 A1    Oct. 29, 2015

Related U.S. Application Data

(63) Continuation of application No. 13/961,721, filed on Aug. 7, 2013, now Pat. No. 9,210,382, which is a continuation of application No. 12/790,108, filed on May 28, 2010, now Pat. No. 8,533,459, which is a (Continued)

(51) Int. Cl.
*H04N 7/167* (2011.01)
*H04N 7/16* (2011.01)

(52) U.S. Cl.
CPC ............. *H04N 7/167* (2013.01); *H04N 7/163* (2013.01); *H04N 7/1675* (2013.01)

(58) Field of Classification Search
CPC ...................... H04N 7/167; H04N 7/1675
USPC .......... 380/200, 239, 277, 278; 713/189–192
See application file for complete search history.

(56) References Cited

U.S. PATENT DOCUMENTS 5,689,559 A * 11/1997 Park .................... G06F 21/10
                                                         360/60
6,021,197 A *  2/2000 von Willich ........ H04N 7/1675
                                                         348/E7.056

(Continued)

OTHER PUBLICATIONS

Hanna et al., "Demultiplexer 1C for MPEG2 Transport Streams" Consumer Electronics, 1995., Proceedings of International Conference on p. 252.*

(Continued)

*Primary Examiner* — Roderick Tolentino
(74) *Attorney, Agent, or Firm* — John L. Rogitz

(57) ABSTRACT

According to one embodiment, a method of descrambling digital multimedia content starts by sending an out-of-band request for encrypted control data to a headend. A descrambler integrated circuit may then receive digital program data in a scrambled, format and the encrypted control data. The encrypted control data may then be decrypted entirely within the descrambler integrated circuit using a multiple-step decryption process starting with a unique key permanently stored in the descrambler integrate circuit and using the partial decryption of control data from the previous decryption step to generate a key to decrypt subsequent encrypted control data. The scrambled digital program data may then be descrambled in the descrambler integrated circuit using the decrypted control data from the last decryption step. Other embodiments are described.

15 Claims, 21 Drawing Sheets

Related U.S. Application Data continuation of application No. 10/387,163, filed on Mar. 11, 2003, now Pat. No. 7,730,300, which is a continuation-in-part of application No. 09/497,393, filed on Feb. 3, 2000, now Pat. No. 6,697,489.

(60) Provisional application No. 60/126,805, filed on Mar. 30, 1999.

(56) References Cited

U.S. PATENT DOCUMENTS

| | | | | |
|---|---|---|---|---|
| 6,061,451 A * | 5/2000 | Muratani | ............ | H04N 7/1675 348/E7.056 |
| 6,073,122 A * | 6/2000 | Wool | ............ | H04H 60/23 348/E7.056 |
| 6,209,098 B1 * | 3/2001 | Davis | ............ | G06F 12/1408 380/284 |
| 6,370,649 B1 * | 4/2002 | Angelo | ............ | G06F 21/31 235/382 |
| 6,490,356 B1 * | 12/2002 | Beuque | ............ | G06F 9/4843 380/216 |
| 6,714,650 B1 * | 3/2004 | Maillard | ............ | H04N 5/913 348/E5.004 |
| 6,904,522 B1 * | 6/2005 | Benardeau | ............ | H04L 29/06 348/E7.056 |

OTHER PUBLICATIONS

Kitson et al. "BBC select: a terrestrial subscription television service" Broadcasting Convention, 1992. IBC., International pp. 405-409.*

* cited by examiner

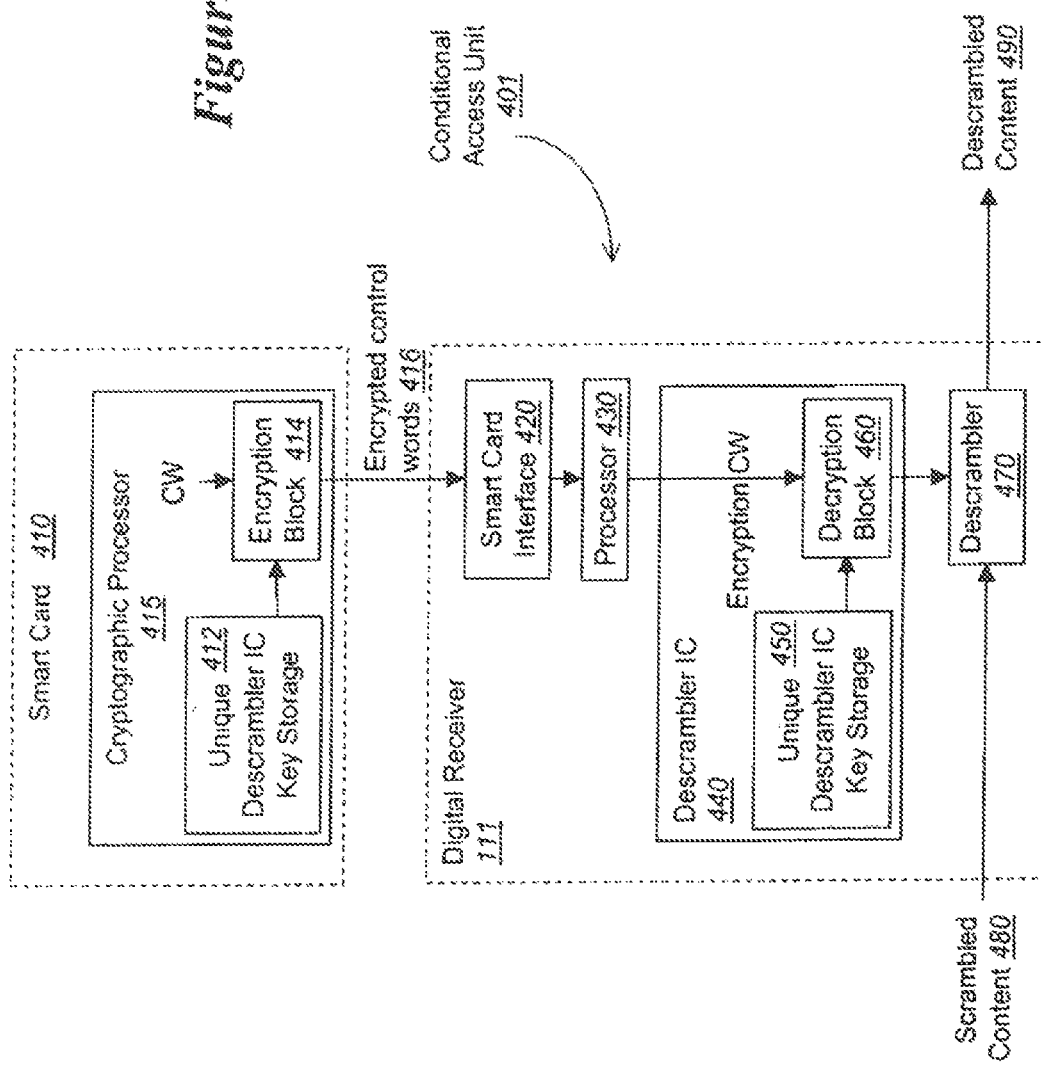

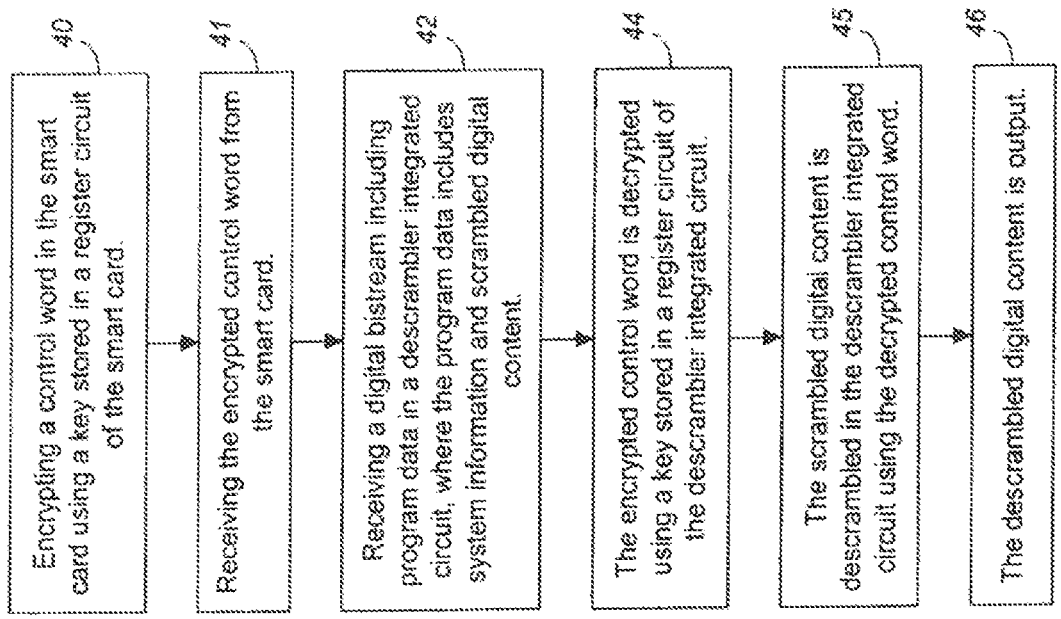

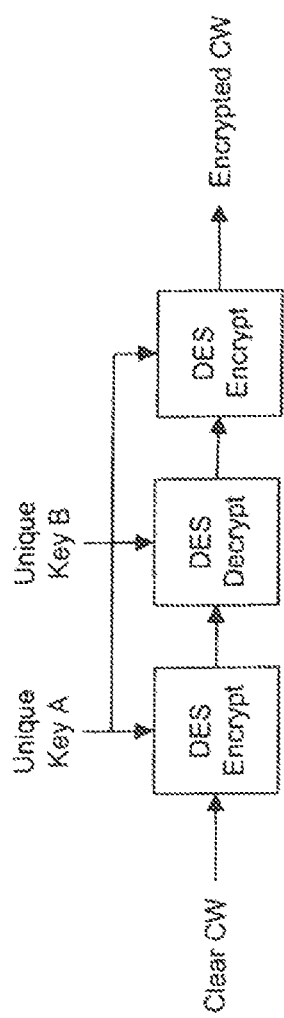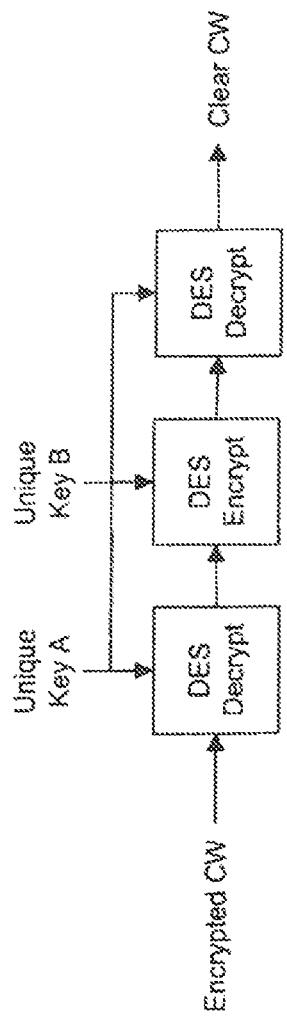

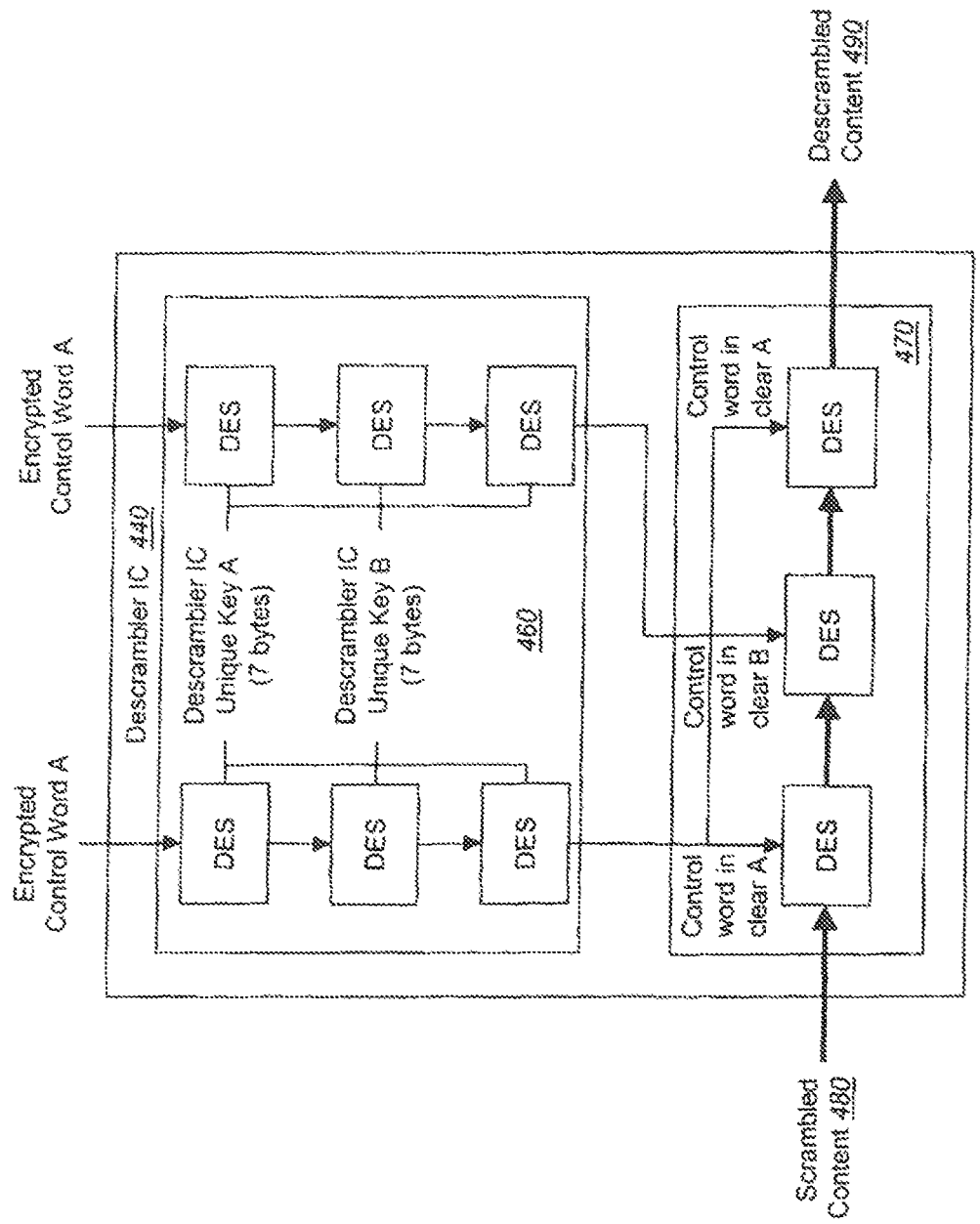

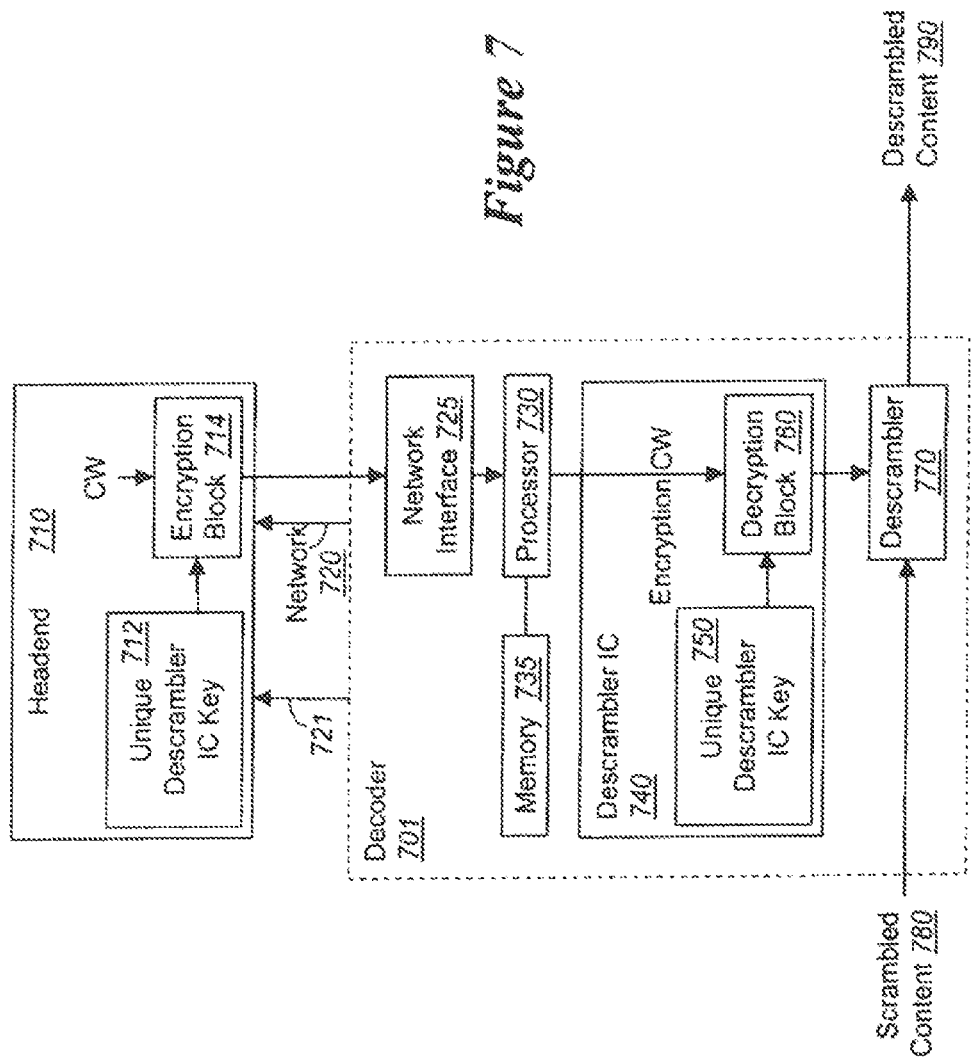

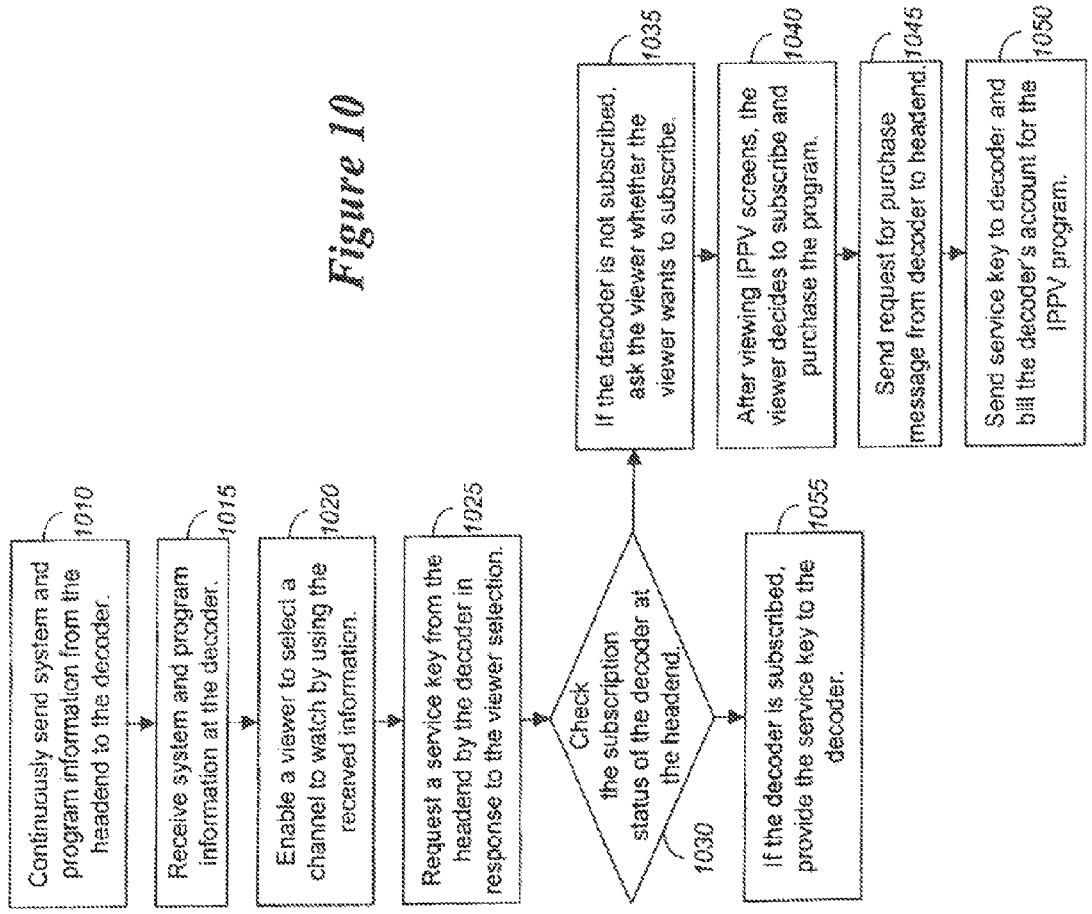

*Figure 11C*

| Entitlement Management Message | |
|---|---|
| STB Serial Number | (64 bits) |
| EMM Length | (16 bits) |
| Mating Key Generator | (64 bits) |
| Key ID #1 | (16 bits) |
| Encrypted Key #1 | (64 bits) |
| ... | |
| Key ID #M | (16 bits) |
| Encrypted Key #M | (64 bits) |

*Figure 14B*

METHOD AND APPARATUS FOR PROTECTING THE TRANSFER OF DATA

CROSS-REFERENCE TO RELATED APPLICATIONS

This application is a continuation of U.S. patent application Ser, No. 12/790,108 filed on May 28, 2010, which is a continuation of U.S. patent application Ser. No. 10/387,163 filed Mar. 11, 2003, now U.S. Pat. No. 7,730,300 which is a continuation-in-part application of U.S. patent application Ser. No. 09/497,393 filed Feb. 3, 2000, now U.S. Pat. No. 6,697,489, which is based on a U.S. Provisional Application No. 60/126,805, filed on Mar. 30, 1999.

BACKGROUND

1. Field

Embodiments of the invention relate to digital devices. More specifically, one embodiment of the invention relates to an apparatus and method for descrambling digital content in digital devices.

2. General Background

Analog communication systems are rapidly giving way to their digital counterparts. Digital television is currently scheduled to be available nationally. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require content providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee sub-groups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device. This allows for the authentication or any digital device prior to the transmission of the digital content in order to determine whether the device is compliant. The digital content is itself encoded prior to transmission so that unauthorized copying of the content will result in copy having an unintelligible format.

One method of encoding the content has been proposed by the DHSG, and is based on watermarking techniques. Although the main focus of the DHSG proposal has been for copy protection of digital movie and video content, particularly as applied to DVD systems,, if is expected, to be applicable to the copy protection of any digital content distributed electronically via digital broadcasts and networks. The watermarking techniques, which are invisible to the user, allow the incoming content to be marked in a manner that makes it extremely difficult to discern precisely how the content was encoded, and thus extremely difficult to remove or alter the watermark without damaging the content. The DHSG has determined three primary cases of detection and control that such a technology should accomplish: playback, record and generational copy control. It is anticipated that the watermarking technology will allow the content provider to specify at least whether the content is "copy never," "copy once," and "copy free" content. "Copy never" is used to mark digital content to indicate that the content is not allowed to be copied, while "copy free" indicates that the content may be copied freely and which can be marked with additional information. This is different than material that is never marked. Finally, "copy once" is used to indicate that the digital content is allowed to be copied only once. As a copy is being made, the original "copy once" content and the newly copied content are re-marked with "no more copy." Of course, other types of copy management, commands may limit the playing or reproduction of such digital content; for example, to a specific period of time, duration, or number of plays or viewings.

Thus, the functionality of digital devices such as set-top boxes, digital televisions, digital audio players, and similar such digital devices extends beyond their historical role of conditional access (CA), i.e., merely descrambling content to a CA-clear format for real-time viewing and/or listening, and now include constraints and conditions on the recording and playback of such digital content. For example, currently, copying of scrambled content for subsequent descrambling and viewing or listening may be permitted with the appropriate service/content provider authorization or key provided to the digital device.

Traditional conditional access systems for Pay-TV originated from one-way broadcast systems where a back channel was not available. A cryptographic processor, such as a smart, card, in a conditional access unit, such as a set-top box, for example, is generally infused with information and functionality in order to automatically grant access to programs.

For example, a smart card with a Pay-TV access control application typically receives entitlement/management messages (EMMs) which grant certain service rights. Typically, services or group keys are delivered at the same time, and if the set-top box is allowed to view IPPV programs, then credit and cost limit information may be transmitted as well.

When tuning to a program, the smart card receives Entitlement Control ties cages (ECMs), which describe which entitlements the smart card needs in order to grant access to the show. Hackers may attempt to manipulate both EMMs and ECMs to view programs without paying the requisite subscription fees. Not only are the EMMs and ECMs manipulated, but the hardware is attacked as well. This combination of software and hardware attacks are used to cause the smart card to decrypt scrambled programs without authorization from the provider of the programs.

Once fielded, it is hard to change the functionality of the smart cards. Mechanisms for downloading new code to smart cards are prone to attack by hackers who may try to use the same mechanisms to load pirate code into the smart card in order to steal programs. One "safe" way to upgrade the access control system is to remove existing smart cards from the field and provide new ones. However, this can be costly and logistically difficult.

BRIEF DESCRIPTION OF THE DRAWINGS

Embodiments of the invention are illustrated by way of example and not by way of limitation in the figures of the accompanying drawings, in which like references indicate similar elements and in which:

FIG. 2 is a first exemplary embodiment of a secure content delivery system that comprises the conditional access unit adapted to operate with a smart card;

FIG. 3 is an exemplary embodiment of a method for securely transferring control words from the smart card to the conditional access unit of FIG. 2;

FIGS. 4 and 5 are exemplary embodiments of a method for encrypting and decrypting a control word;

FIG. 6 is an exemplary embodiment of the descrambler integrated circuit implemented within the conditional access unit of FIG. 2;

FIG. 7 is a second exemplary embodiment of a secure content delivery system that comprises a decoder adapted to a headend server via a network connection;

FIG. 10 is an exemplary embodiment of a method for requesting and receiving control words or service keys;

FIG. 11C is an exemplary embodiment of an entitlement management message (EMM) routed to a set-top box of the system of FIG. 11A;

FIG. 14B is an exemplary embodiment of an entitlement management message (EMM) routed to a set-top box of the system of FIG. 11A;

DETAILED DESCRIPTION

Various embodiments of the invention relate to an apparatus, system and method for protecting the transfer of data. In one embodiment. such protection involves the descrambling or decrypting of digital content from one or more content providers in digital devices. Examples of a "content provider" include, but are not limited to a terrestrial broadcaster, cable operator, direct broadcast satellite (DBS) company, a company providing content for download via the internet, or any similar sources of content.

In the following description, certain terminology is used to describe features of the invention. For example, the terms "component", "block" or "logic" are representative of hardware and/or software configured to perform one or more functions. For instance, examples of "hardware" include, but are not limited or restricted to an integrated circuit such as a processor (e.g., microprocessor, application specific integrated circuit, a digital signal processor, a micro-controller, etc.). Of course, the hardware may be alternatively implemented as a finite state machine or even combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

The term "program data" generally represents any type of information being transferred over a secure content delivery system. Examples of program data include system information, one or more entitlement control messages or entitlement management messages, digital content, and/or other data, each of which will foe described briefly below. A "message" is a collection of bits sent as a bit scream, a packet or successive packets.

Figure 1:
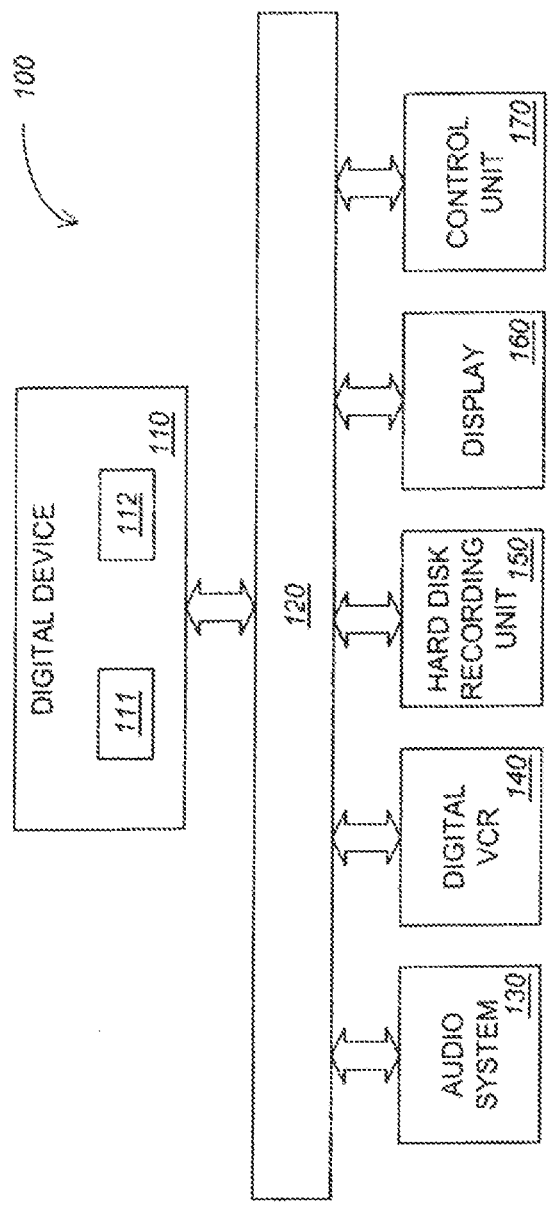
FIG. 1 is an exemplary embodiment of an entertainment system including a digital device.

Referring to FIG. 1, an exemplary embodiment of an entertainment system 100 is shown. The entertainment system 100 includes a digital device 110 for receiving information including program data from one or more content providers. The program data may foe propagated as a digital bit stream for example. The digital device 110 may operate as any number of products such as a set-top box or one or mere components integrated into a television, computer, audio-playback device (e.g., digital radio), audio-recording device (e.g., MP3 player), video-recording device (e.g., TIVO® recorder by TiVo Inc. of Alviso, Calif.), or the like.

For instance, the digital device 110 may be configured in accordance with an embedded architecture, a split security architecture, or an external security architecture. As an embedded architecture, in one embodiment, digital device 110 is implemented as a set-top box that comprises fixed, internal circuitry supporting both entitlement management and descrambling operations.

Alternatively, in accordance with a split security architecture embodiment, the digital device 110 may be adapted to receive a removable smart card that handles entitlement management, while descrambling of incoming program data is controlled, by internal circuitry.

Yet, in accordance with an external security embodiment, the digital device 110 may be a "point-of-deployment" product with a PCMCIA card handling both entitlement management and descrambling operations by sending and receiving messages over an Out-of-Band channel.

Of course, as yet another alternative embodiment, external security type may also be split so that the PCMCIA card, may be configured to handle descrambling operations, but adapted to communicate with a smart card for handling entitlement management. These and other embodiments of the digital device 110 may be implemented while still falling within the spirit and scope of the invention.

The digital device 110 comprises a receiver 111, which processes the incoming information, extracts the program data therefrom, and provides the program data in a perceivable format (e.g., viewable and/or audible). As mentioned previously, the program data may include at least one or more of the following: system information, entitlement control messages, entitlement management messages, digital content, and other data.

Herein, "system information" may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with an entitlement control, message (ECM), which is generally used to regulate access to a particular channel or service. An "Entitlement Management Message" (EMM) may be used to deliver entitlements (sometimes referred to as "privileges") to the digital receiver 111. Examples of certain entitlements may include, but are not limited to access rights, access parameters, and/or descrambling keys. A descrambling key is generally a code that is required by descrambler logic to recover data in the clear from a scrambled format based on the entitlements granted. Finally, "content" in the program data stream may include images, audio, video or any communication thereof. The content may be in a scrambled or clear format.

As shown, when implemented as a set-top box, the digital device 110 may be coupled to other components in the entertainment system 100 via a transmission medium 120. The transmission medium 120 operates to transmit control information and data including program data between the digital device 110 and other components in the entertainment system 100. The transmission medium 120 may include, but is not limited to electrical wires, optical fiber, cable, a wireless link established by wireless signaling circuitry, or the like.

Depending on the type of product corresponding to the digital device 110, the entertainment system 100 may include an audio system 130 coupled to the transmission medium 120, A digital VCR 140, such as a D-VHS VCR, may also be coupled to the digital device 110 and other components of the entertainment system 100 through the transmission medium 120.

A hard disk recording unit 150 may also be coupled to digital device 110 and other components via transmission medium 120. Display 160 may include a high definition television display, a monitor, or another device capable of processing digital video signals. Finally, a control unit 170 may be coupled to the transmission medium 120. The control unit 170 may be used to coordinate and control the operation of some or each of the components on the entertainment system 100.

The content of a digital program may be transmitted in scrambled form. In one embodiment, as part of the program data, access requirements may be transmitted along with the scrambled content to the digital device 110 that is implemented with the receiver 111 functioning as a conditional access unit, especially when the digital device 110 operates as a set-top box. An "access requirement" is a restrictive parameter used to determine if the digital device 110 implemented with conditional access functionality, hereinafter referred to herein as the "conditional access unit 110," is authorized to descramble the scrambled content for viewing or listening purposes. For example, the access requirement map be a key needed to perceive (view and/or listen to) the content, a service tag associated with a given content provider, or even a particular descrambling software code.

When a scrambled program is received by the conditional access unit 110, the access requirements for the program are compared to the entitlements that the conditional access unit 110 actually has. In order for the conditional access unit 110 to display the scrambled content in clear form, in one embodiment, the access requirements for the program are compared to the entitlements of the conditional access unit 110. The entitlements may state that the conditional access unit 110 is entitled to view/playback content from a given content provider such as Home Box Office (HBO), for example. The entitlements may also include one or more keys needed to descramble the content. The entitlements also may define the time periods for which toe conditional access unit 110 may descramble the content.

Thus, in one embodiment, access requirements and entitlements form a part of the access control system to determine whether a conditional access unit or a decoder is authorized to view a particular program. It is contemplated that the description below focuses on mechanisms to recover audio/visual content such as television broadcasts, purchased movies and the like. However, it is contemplated that the invention is also applicable to the descrambling of audible content only (e.g., digitized music files).

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT), repurchase of copy never movies, personal scrambling, and regional pay per view. "Impulse pay per view" is a feature which allows purchase of pay per view movies through credit that has been previously downloaded into the set-top box. Purchase records may be stored and forwarded by phone to a billing center, "time based historical" allows access to content that was delivered during a past time period, such as March through December, 1997, for example. The access requirements and entitlements can also provide consumers with different options for storing the scrambled content.

The access requirements may be delivered to the conditional access unit, located within digital device 110 or coupled thereto over transmission medium 120, using packet identifiers (PIDs). Each PID may contain the access requirements associated with a given service or feature. The content that is delivered to the conditional access unit may also include a large number of Plus, thus enabling special revenue features, technical features, or other special features to be performed locally.

Before receiving the content, the customer may be given a number of choices for gaining access to the content that is going to be stored to media. The customer may be required to purchase the right to access and view the content. Therefore, if the customer wants to record the content for later retrieval and viewing, the access requirements that the customer bought also need to be stored with the content.

Figure 18:
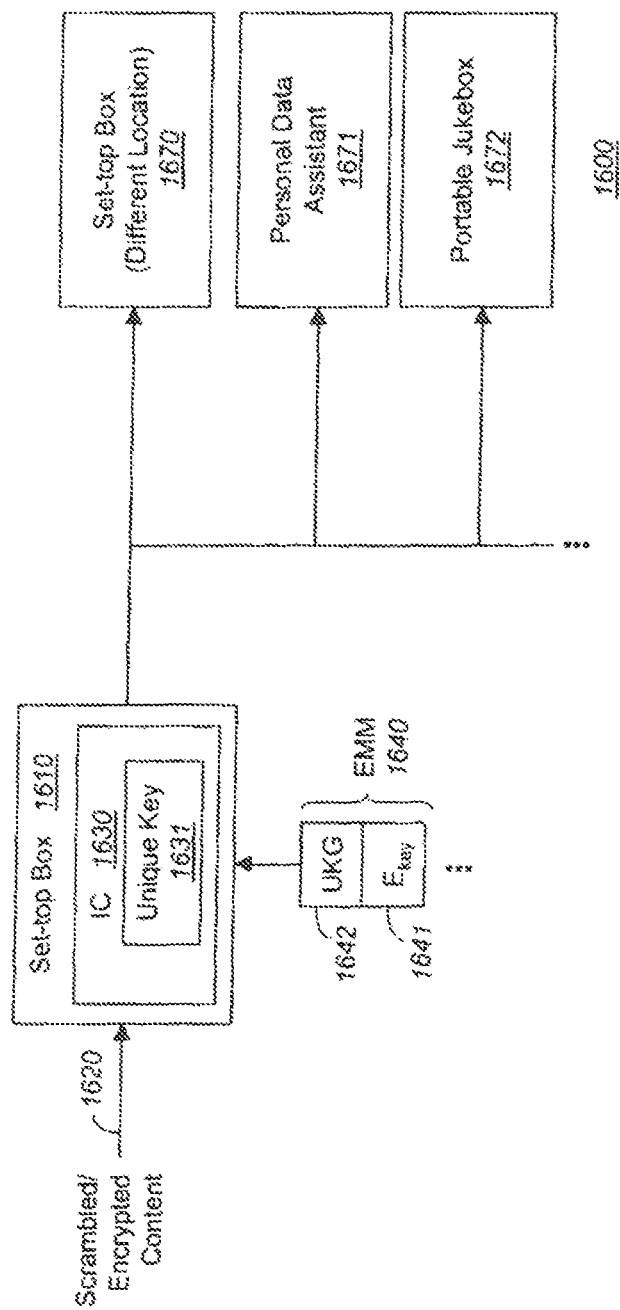
FIG. 18 is an exemplary embodiment of a portion of a seventh exemplary embodiment of a secure content delivery system in which the digital device is adapted with copy protection functionality.
Figure 19:
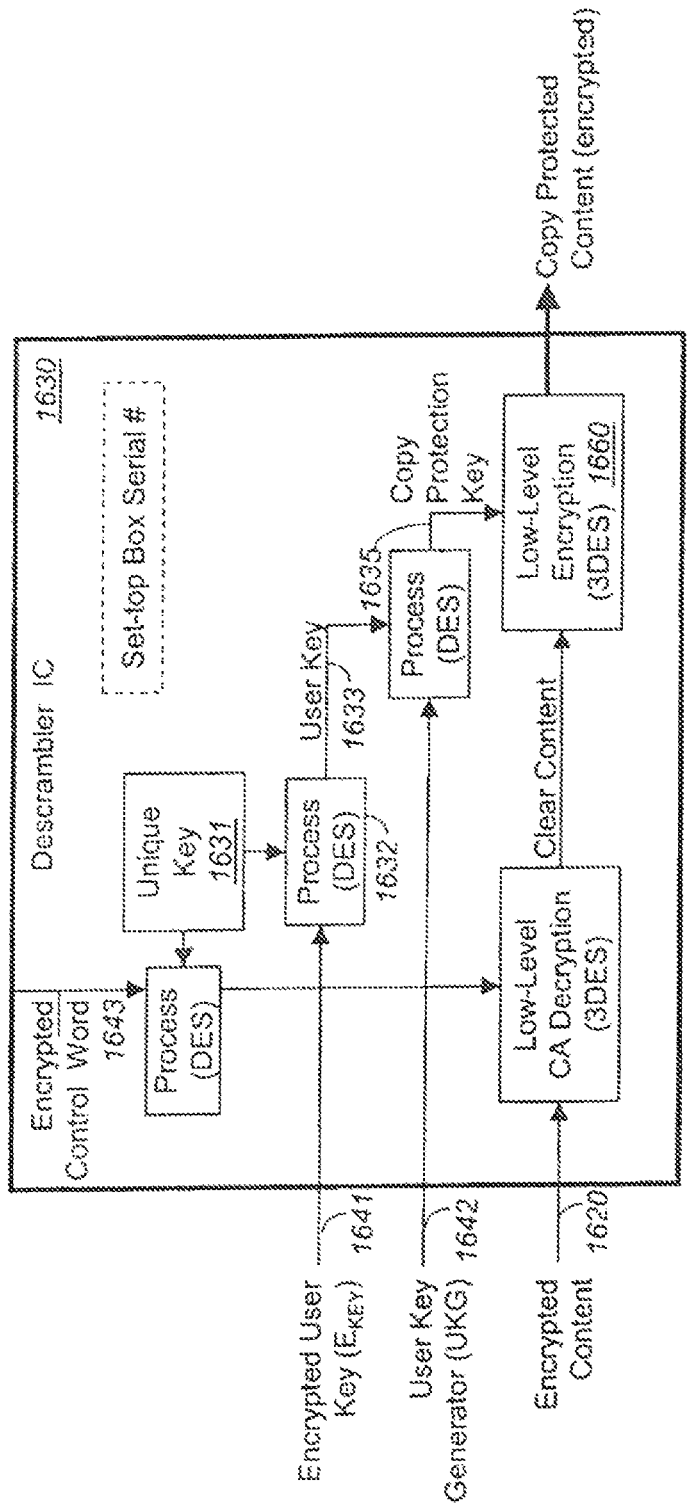
FIG. 19 is an exemplary embodiment of the decoder implemented, within the digital device of FIG. 18.

In addition, there may be copy-protection applied to the descrambled content (e.g., transport stream) as shown in FIGS. 18 and 19, Copy-protected content will be re-scrambled across an interface interconnecting a destination interface (e.g., NRSS-A, NRSS-B or POD module interfaces) and a source. The source and destination interface need to agree on the key used to re-encrypt this content. This copy protection key can be encrypted with the unique key associated with the digital device. The unique key can be received through an EMM or other method, e.g. factory load procedure.

As seen in FIG. 2, a first exemplary embodiment of a secure content delivery system that comprises a conditional access unit 401 adapted to operate with a smart card interface 420 is shown. This embodiment is consistent with a split security architecture and an external security architecture. In a split security architecture implementation, the digital device 110 operates as the conditional access unit 401 (e.g., equivalent to conditional access unit 110 of FIG. 1), but is implemented as a set-top box or other type of digital device. In an external security architecture implementation, conditional access unit 401 is a NRSS-B conditional access unit.

Although the smart card interface 420 may be built into the digital receiver 111, it is expected that the digital receiver 111 will have an expansion slot, such as a PCMCIA slot or Universal Services Bus (USB) slot for example, to receive a card or device 410 complementary to the interface 420. For this embodiment, the digital receiver 111 comprises an optional processor 430 and a descrambler integrated circuit (IC) 440.

Smart card interface 420 receives a smart card 410 including one or more encrypted control words for descrambling scrambled program concerns. Smart card 410 may transmit the control word(s) in encrypted form to the smart card interface 420. In order to protect the one or more control words, referred to as "CW," from being improperly extracted by an interloper monitoring communications between the smart card 410 and the smart card interface 420, the smart card 410 may use an encryption key unique to conditional access unit 401 to encrypt the CW. This allows the conditional access unit 401 to decrypt the CP in a secure manner and use the clear control words to descramble the program content.

More specifically, according to one embodiment, an external cryptographic processor 415 of an ISO 7816 smart card for example, receives the CW needed to descramble content. A storage element 412 (e.g., register or ether volatile or non-volatile memory; is previously loaded with one or more keys for encrypting the CW. Such loading may be performed during manufacture of the smart card 410, during manufacture of the storage element 412 or the cryptographic processor 415 when the storage element 412 is on-chip memory of she cryptographic processor 415, or perhaps via a communication pathway through conditional access unit 401 over smart card interface 420 (not shown). The encryption block 414 of the smart card 410 (e.g., software or firmware executed by cryptographic processor 415, dedicated hardware, etc.) encrypts the CW with the one or more keys that are unique to descrambler IC 440.

For this embodiment, the smart card 410 delivers the encrypted CW to the processor 430 through interface 420, although the encrypted CW may be sent directly to decryption block 460 (e.g., state machine or dedicated circuitry). The processor 430 may be implemented to perform additional operations to counteract additional obfuscation techniques performed on the CW, other than encryption using keys identical to or derivatives from those keys stored in the descrambler IC 440. It is noted that the CW is maintained in an encrypted former until processed by the descrambler IC 440. Therefore, the communications between the processor 430 and the descrambler IC 440 are secure.

The descrambler IC 440 in the conditional access unit 401 will decrypt the CW using one or more unique keys stored in a storage element 450. In one embodiment, the storage element 400 comprises one or more key registers loaded at manufacturer or after implemented within the conditional access unit 401 through initial program data, transmitted to the conditional access unit 401.

Then, according to one embodiment, the decryption block 460 then writes the decrypted CW alternately into ODD and EVEN key storage elements (not shown) of descrambler logic 470 located in the descrambler IC 440. The descrambler logic 470 then applies the ODD/EVEN CW to the incoming scrambled content 400 at the right time and outputs descrambled program content 490. Of course, alternatives to the loading of ODD and EVEN key storage elements may be utilized for descrambling of the incoming scrambled content 480.

Thus, the transfer of the CW from the smart card 410 to the conditional access unit 401 is secure, because the CW is transferred in encrypted form. The CW remains secure in the conditional access unit 401 because the CW is not decrypted by the nor secure processor 430. The CW is only decrypted in the descrambler IC 440 that actually uses the CW, therefore, the CW is never exposed in the clear, and cannot be obtained by hackers.

Furthermore, the key used to decrypt the CW is stored in hardware (e.g., storage element 450) of the descrambler IC 440. The storage element 450 cannot be hacked unless the silicon of the storage element 400 is probed. An attempt may be made to exhaustively trial a key stored in storage element 450 in IC 440. However, if the key is sufficiently large, the means of attack, will be deemed hopeless. Furthermore, the key may only be valid for one particular conditional access unit 401, and may not be used by other units to decrypt the CW, because the CW is encrypted by the smart card 410 using a key or CW that is unique to an associated conditional access unit 401. Therefore, the transmission of the encrypted control word(s) from smart card 410 to conditional access unit 401 is secure and the control word(s) is (are) not vulnerable to theft by hackers.

The descrambler IC 440 bandies the secure processing of the control words. This descrambler IC 440 has no CPU, no firmware, and no software. There is no complicated key hierarchy. A non-processor based descrambler IC 440 receives the encrypted CW, applies a unique key to it, and decrypts it. No instructions, no code, no hashing, and no software is loaded into the decryption block 460. The decryption is performed entirely by a hardware circuit or state machine of the descrambler IC 440 using only a single key function.

One or more unique keys, generally referred to as "Unique Key" herein, may be programmed into the storage element 450 during manufacture. For example, in one embodiment, the descrambler IC 440 has a non-volatile, unique key storage element 450 that can be written only once. When the set-top box, television, or NRSS-B module is manufactured, the storage element 400 is programmed. In this embodiment, there is no way to either improperly read or overwrite the Unique Key that was originally loaded into the storage element 450. An association between the serial number of the conditional access unit 401 and the Unique Key loaded into the descrambler IC 440 of the conditional access unit 401 may be recorded.

When the conditional access unit 401 is manufactured and a smart card 410 is installed, the smart card 410 can receive the Unique Key associated, with the conditional access unit 401 at the time of pairing. From then on, the smart card is "paired" to that particular host (e.g., the conditional access unit 401). Later, if the smart card 410 is over replaced or moved to a new host, the smart card 410 may be adapted to receive the Unique Key associated with the new host via an Entitlement Management Message (EMM). Of course, as an alternative, a new smart card with a newly programmed Unique Key may also be delivered to the user.

An exemplary method for transferring the CP from the smart card 410 to the conditional access unit is shown in FIG. 3. A control word is encrypted in the smart card 410 using a key scored in non-volatile memory of the smart card (block 40). The key stored in the smart card is associated with the key stored in the storage element of the descrambler IC. The encrypted control word is received from the smart card (block 41).

This method includes receiving a digital bitstream including program data in a descrambler IC, where the program data includes system information and scrambled digital content (block 42). The encrypted control word is decrypted using a key stored in a storage element of the descrambler IC (block 44). The scrambled digital content is descrambled in the descrambler IC using the decrypted control word (block 45), and the descrambled digital content is output (block 46).

Embodiments of the encryption and decryption functions performed by encryption block 414 and decryption block 460 are shown in FIGS. 4, 5 and 6. These operations transform the CW based on the Unique Key stored m storage elements 412 and 450. An encryption algorithm such as DES, M6, or DVB Common Scrambling Algorithm may be used. In the embodiments shown in FIGS. 4, 5 and 6, Triple DES is used. As shown in FIG. 6, the descrambler IC 440 uses Triple DES to decrypt the CP in decryption block 400. The decrypted CW is then used by descrambler logic 470 to descramble the scrambled program content 480 and output clear program content 490.

However, because the encryption and decryption of the control word(s) is local to the set-top box, it is possible to phase in the deployment of increasingly more robust encryption. For example, single DES may be initially deployed, and later double or triple DES can be phased in with no consequence to already fielded paired units of set-fop boxes and smart cards. The key length of the Unique Key may be at least as large as the descrambled CW, to help reduce attacks on the Unique Key by hackers.

In an alternative embodiment of the conditional access unit implementation of FIG. 2, the smart card may be replaced by the headend 710 of a out-way or two-way network 720 as shown in FIG. 7. The headend 710 maintains the access rights for the digital device operating as a decoder (referred to as "decoder 701"), instead of maintaining such access rights in a local cryptographic processor 415 of FIG. 2. The headend 710 can deliver one or more service keys (generally referred to as "Service Key") based on the unique Key stored in the Descrambler IC 740. The encrypted Service Key may be stored locally in the decoder 701 to facilitate transitions from one channel to another. The Service Key are stored in encrypted form, and are loaded as needed into the Descrambler IC 740. The Service Key is decrypted only in the Descrambler IC 740, by using one or more Unique Keys stored in memory 750 of the Descrambler IC 740. In one embodiment, the Service Fey is used as a control word to descramble the content directly. In another embodiment, the Service Key is used to decrypt one or more control words, which are received in-band with the scrambled content and subsequently used for descrambling purposes.

The Service Key may be encrypted and decrypted using one of the algorithms used for the control words in the embodiments of FIGS. 2, 4, 5 and 6 described above. The algorithm used to encrypt, and decrypt the Service Key may be different than the algorithm used to scramble and descramble the program content. For example, M6 may be easier to do in software in either the smart card or the headend key server. Also, each Service Key may be encrypted, using different public and proprietary encryption algorithm. These different proprietary algorithms may be considered as anti-piracy measures to invalidate clone hardware.

The headend 710 can deliver one or more Service Keys on a channel or "tier of service" basis in EMMs. The Service Keys are encrypted, stored locally in decoder 701 and used by a processor 730 as needed when tuning to different channels. Because the set-top boxes are fielded in high volume as compared to the headend 710, eliminating the smart cards (and corresponding cryptographic processors), from the set-top boxes can greatly reduce the cost of implementing a pay-TV system in a network.

While this embodiment works in one-way (non-IPPV) broadcast networks, it also performs in two-way, interactive networks, where the keys for a particular service are requested, such as IPPV or VOD purchases or any other non-subscription service. A return channel 721 is used to request the Service Key(s) because the ability to grant access to a new service is performed by the headend 710 instead of a local controlling cryptographic processor.

In order to avoid overload problems at the headend 710 caused by a large number of simultaneous impulse buys of IPPV programs, a Free Preview period can be determined, and IPPV programs can be marketed in advance of the actual viewing. In this embodiment, Service Keys for individual shows or movies may be requested by the decoder 701 and delivered ahead of time. For example, interactive networks, such as a cable system having the return channel 721 such as a DOCSIS modem or Out-of-Band transmitter/receiver for example, can deliver a Request for Program Key (RPK) message from the decoder 701 to the headend 710. Alternatively, the decoder 701 may request the Service Keys in real-time for each program accessed.

A controller (not shown) on the network headend server 710 processes the RPK message. The RPK message may contain an address or the decoder 701 as well as information needed to identify the channel to be viewed (all of which may be obtained from Motion Picture Experts Group (MPEG) system and program information already processed by the insecure processor). The request may be encrypted, if desired, for non-repudiation and prevention of denial of service attacks, such as IPPV or VOD requests for example.

Upon receipt of the message, the headend 710 accesses entries of an access control list (listing each entitlement, of the decoder 701) and verifies the decoder is authorization to receive a particular Service Key. If authorized, the headend server 710 sends the Service Key (encrypted using a Unique Key of the decoder 701 located in the Descrambler IC) to the decoder 701.

Figure 8:
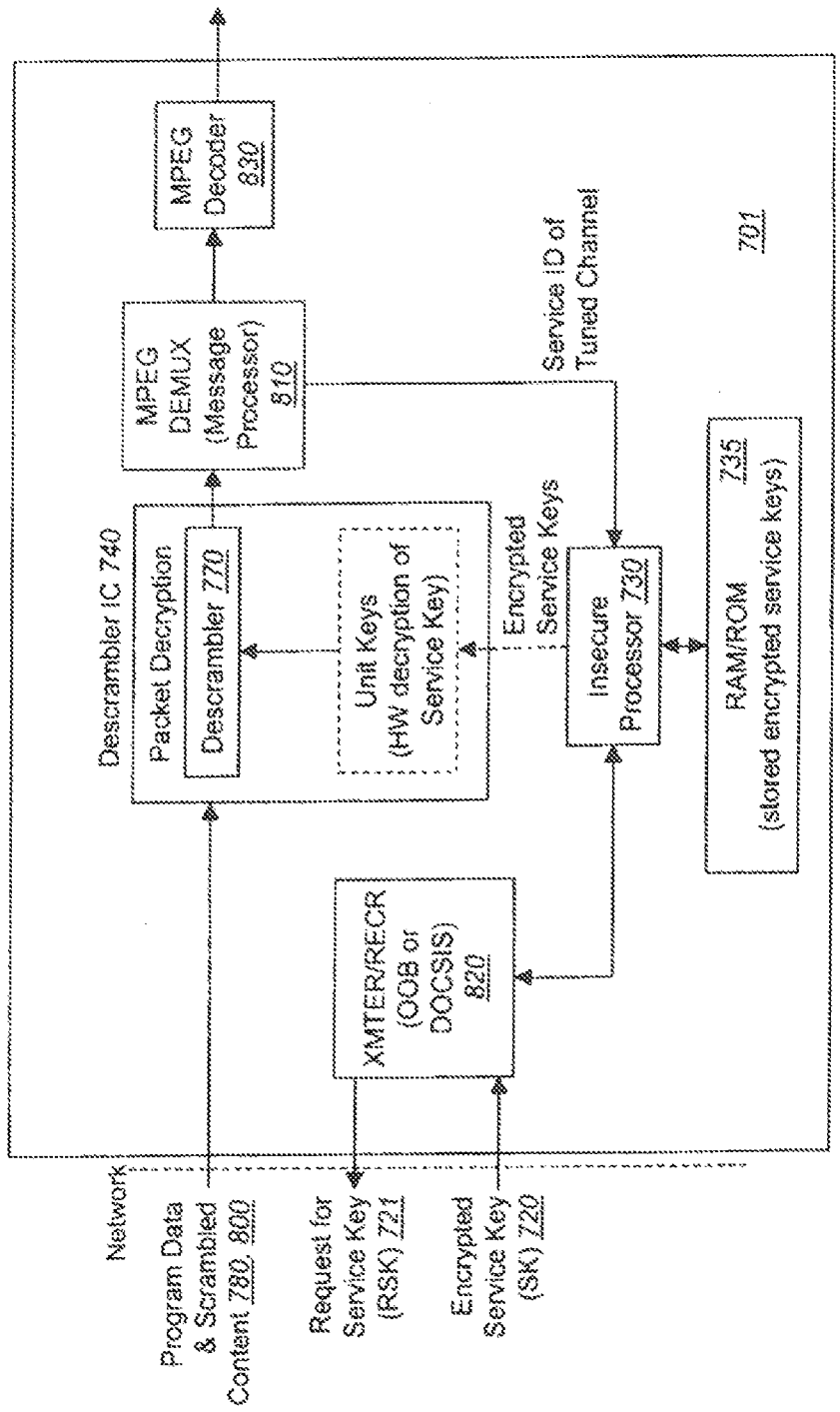
FIG. 8 is a more detailed, illustration of the decoder adapter to the headend server of FIG. 7.

FIG. 8 provides a more detailed illustration of the decoder 701 of FIG. 7 adapter to the headend server 710 for request and receipt of one or more Service Keys. According to one embodiment, program data 800 such as an Entitlement Control Message (ECM) or meta-data associated with an Electronic Program Guide (EPG) is provided to the decoder 701 by a content provider. The program data 800 is adapted to convey at least an identifier of the desired Channel or Service (referred to as "Channel or Service ID"). In the event that the program data 800 is an IPPV or VOD program, the program, data 800 may further include a Program identifier (PID). This is because no ECM processing other than identifying the appropriate encrypted key from memory, and using it to write it into the appropriate storage element (or register) of the Descrambler IC 740 needs to be performed.

An MPEG Demultiplexer 810 operates as a message processor to extract the Channel or Service ID upon detection in program data. The Channel or Service ID are rooted to the processor 730, which in combination with transmitter/receiver logic 820 generates a Request for Service Key (RSK) message over channel 721 for routing to the headend server 710 of FIG. 7.

In response, upon authorization of the decoder 701, the headend server 710 transmits the requested Service Key (SK) in an encrypted format to the transmitter/receiver logic 820, which provides the SK to the processor 730. The processor 730 may store the SK in a memory 735 and/or provide the SK to the descrambler IC 740 for descrambling incoming scrambled content in real-time. For instance, the memory 735 is an optional component for use if it is desirable to storage the SK locally. Where the SK is not stored locally but is accessed from the headend server 710 as needed, memory 735 may be removed from the decoder 701.

Upon receiving the scrambled content of the program data, the descrambler IC 740 descrambles such content, which is subsequently supplied to MPEG decoder 830 if the content is compressed with a MPEG format. The MPEG decoder 830 decompresses the digital content and subsequently routes the decompressed digital content to either a digital-to-analog (D/A) converter for display on a television, a Digital Video Interface (DVI) link or a network interface (e.g.., IEEE 1394 link).

As shown, the processor 730, memory 735, descrambler IC 740, MPEG Demultiplexer 810, transmitter/receiver logic 820 and MPEG decoder 830 may be implemented on two or more integrated circuits interconnected through bus traces or another communication scheme (e.g., wires, optical, fiber, etc.). Alternatively, these components may be implemented on a single integrated circuit.

In this embodiment, the SK may be valid rot a certain period of time. The decoder 701 may store the SK m the memory 735, allowing the decoder 701 to re-access one service with if SK is still valid without having to request that Service Key again. In this embodiment, the SK is stored in encrypted form (as it comes over the network from the headend 710) in the memory 735.

The SK may be valid for the duration of a program or it may be valid for a selected period of time, e.g. 6 hours. Using a key for a longer period of time will reduce the overall number of transactions between the decoder 701 and the headend server because, once the key is stored in the memory 735 of the decoder 701, it is readily available.

Depending on the duration of the current Service Key (e.g., SK), the next Service Key ($SK_{next}$) may be delivered along with the SK. Alternatively, the decoder 701 may request the $SK_{next}$ after detecting the end of the SK's valid Epoch (e.g., time duration of the SK). In one embodiment, the Service Key is valid for the duration of a user's subscription period.

The Service Key should be identified properly so that it may be applied to a channel being tuned to. When the decoder 701 tunes to a channel, it locks up the appropriate encrypted Service Key from the memory 735 and writes that info the Odd/Even MPEG key register of the descrambler IC 740. As in the embodiment of FIG. 2, the secret Unique Key information may be programmed info the descrambler IC 740 when decoder 701 is manufactured.

In one embodiment, the Service Keys may comprise 56-bit, 112-bit, or 168-bit keys. Table 1 shows the storage requirements for different sizes of keys.

TABLE 1

Number of Bytes to Store Independent Service Keys

| Number of Channels with Independent Keys | Channel ID (3 Bytes) | 16 Byte Triple DES Encrypted Service Key CURRENT | 16 Byte Triple DES Encrypted Service Key NEXT | Total Bytes |
|---|---|---|---|---|
| 20 | 60 | 320 | 320 | 700 |
| 50 | 150 | 800 | 800 | 1,750 |
| 100 | 300 | 1600 | 1600 | 3,500 |
| 200 | 600 | 3200 | 3200 | 7,000 |
| 400 | 1200 | 6400 | 6400 | 14,000 |

Figure 9:
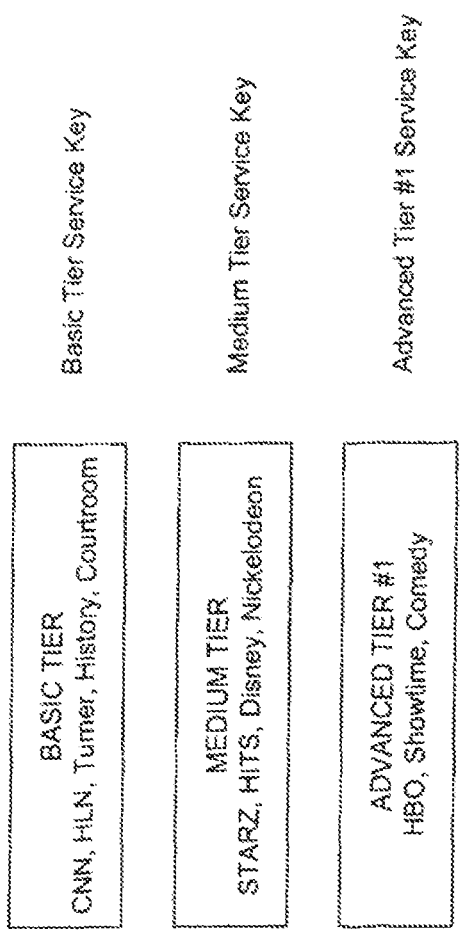
FIG. 9 is an exemplary embodiment of services that may be delivered to the conditional access unit of FIG. 2 or the decoder of FIG. 7 or 8.

Services can be sold a-la-carte or sold as a bouquet or package. There may foe several tiers of services, each identified by a Service ID. For example, there may be a basic tier of services, a medium tier offering more services, and advanced tiers offering different premium services, as shown in FIG. 9. In this embodiment, each incremental tier of services may be given a separate key.

From Table 1 above, if a customer where to subscribe to 20 different types of Service tiers, that would require 60 bytes of ID storage, 320 bytes of storage of the currently valid Service Keys, 320 bytes of storage for the Service Keys valid for the next epoch (or billing period) for a total of 700 bytes.

FIG. 10 shows an exemplary embodiment of a method for requesting and receiving Service Keys. Program information is continuously sent from the headend to the decoder (blocks 1010 and 1015). A viewer then selects a channel to watch (block 1020). The decoder requests a Service Key from the headend (block 1025). The headend, checks the subscription status of the decoder (block 1030). If the decoder is subscribed, the headend provides the Service Key to the decoder (block 1055). If the decoder is not subscribed, the viewer is asked by the decoder to subscribe (block 1035). The viewer decides to subscribe (block 1040). The decoder sends a request for purchase to the headend (block 1045). The headend sends an encrypted Service Key to the decoder (block 1050).

Thus, the decoder 701 of FIG. 7 comprises a Descrambler IC 440 with a Unique Key. Service Keys are delivered to the decoder 701 encrypted by the Unique Key and stored in encrypted form in the decoder 701. Alternatively, the decoder 701 could, request a Service Key each time that the decoder 701 tunes to a channel without storing the Service Keys locally.

The entitlements normally held by the secure cryptographic processor of FIG. 2 are held, by the controlling authority such as a key server in the headend 710 of FIG. 7 for example. The processor 730 in decoder 701 may receive a message (e.g., an ECM or an EMM), which tells it what it is authorized to descramble so that it may properly display viewing options to a viewer. The processor 730 can then request Service Keys for selected channels.

In this embodiment, there is no embedded "secure" firmware or software. Using the hardware decryption circuit mentioned above, an embedded processor core or firmware that performs a cryptographic function is not needed. This enables a number of conditional access applications, which may be downloaded to the insecure processor. The Service Key is unit key encrypted. It may be a public asymmetric key or secret symmetric key.

Additional advantages include Pay-TV applications without using a cryptographic processor by providing the decoder 701 having the Descrambler IC 740 with Unique Keys hardwired into the IC 740. The decoder 701 can request a Service Key or Control Word from a network provider. Local access control can be performed by the processor 730 because the critical "secure" function is isolated in the Descrambler IC 740.

Figure 11A:
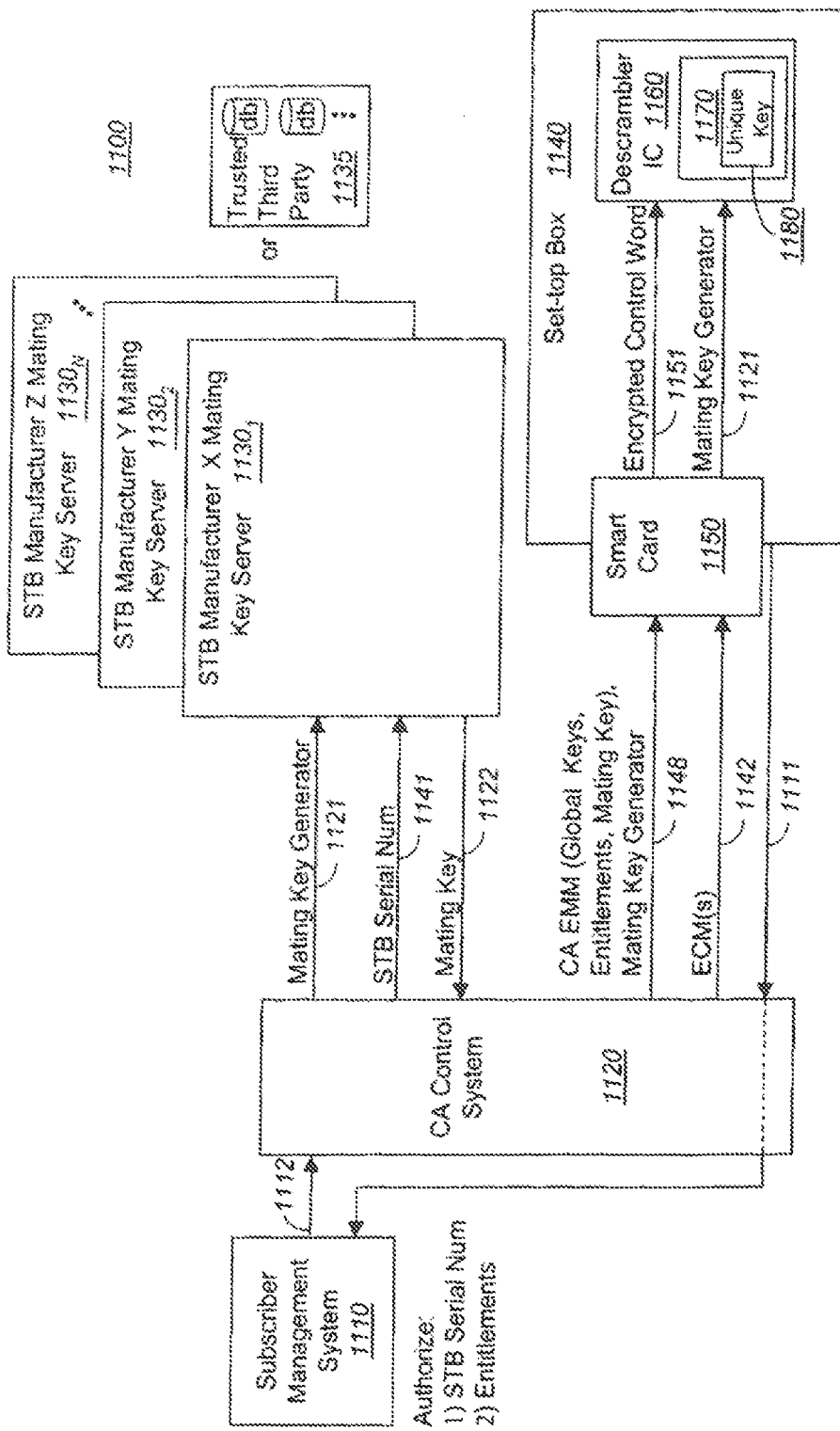
FIG. 11A is a third exemplary embodiment of a secure content delivery system.

Referring now to FIG. 11A, a third exemplary embodiment of a secure content delivery system 1100 is shown. The secure content delivery system 1100 comprises a subscriber management system 1110, a Conditional Access (CA) control system 1120, a plurality of mating key servers associated with different set-top box manufacturers $1130_1$-$1130_n$ (N≥2) and a set-top box 1140 adapted to receive a smart card 1150. The smart card 1150 communicates with a descrambler IC 1160, which includes local memory 1170 configured to store a unique key ("Unique Key") 1180 of the set-top box 1140.

Once a user of the set-top box 1140 desires to receive particular program data, the set-top box 1140 determines whether entitlements associated with the requested program data are already stored therein. If the entitlements are not stored, the user may be notified by a screen display and prompted to provide a request 1111 to the subscriber management system 1110. The request 1111 may be provided by the user via (i) an out-of-band communication pathway (e.g., electronic mail over the Internet, telephone call by the user, etc.) or (ii) an in-band communication pathway to the CA control system 1120 in communication with set-top box 1140 as shown. Alternatively, the request 1111 may be sent automatically or may be routed to CA control system 1120 which performs a lookup of information to authorize the user substantially in real time.

For one embodiment, the request 1111 is a message that comprises an identifier (e.g., an alphanumeric, or numeric code) of the requested content, a serial rubber of the set-top box (referred to as "STB Serial Num") and/or an identifier of the smart card 1100 (referred to as "Smart Card ID"). Implemented as any information processing system (e.g., server, relay station or other equipment controlled by a service provider or content provider), the subscriber management system 1110 processes the request 1111 and determines what entitlements are to be provided to the set-top box 1140. Although not shown, it is contemplated that the CA control system 1120 could be configured to perform a lookup of databases containing serial numbers of set-top boxes or smart card IDs, thereby eliminating access to subscriber management system 1110.

Upon receiving an authorization (AUTH) message 1112 from the subscriber management system 1110, which may include the STB Serial Num and perhaps global keys (e.g., keys used to decrypt ECMs sent in-band with the content), the CA control system 1120 routes the STB Serial Num 1141 and a mating key generator 1121 to at least, one of the mating key servers $1130_1$ ... , or $1130_N$ (generally referred to as "mating key server $1130_i$," where i>1). The CA control system 1120 operates as an intermediary to coordinate delivery of a mating key 1122 that is used to extract the requested program data from downloaded, scrambled information. The CA control system 1120 may he implemented as a headend server, a broadcast station, a satellite uplink or the like.

Alternatively, instead of Ch control system 1120 routing the mating key generator 1121 and STB Serial Num 1141 to a mating key servers $1130_1$-$1130_N$, it is contemplated that such information may be sent to a trusted third party 1135, which maintains and controls access to databases featuring mating keys. The values associated with the mating key generator 1121 and/or STB Serial Num 1141 are used to retrieve the mating key 1122. The "trusted third party" 1135 may include, but is not limited or restricted to a governmental entity, a company independently managed from any set-top box manufacturer, or the like.

Prior to transmission of the STB Serial Num 1141 and the mating key generator 1121, the CA control system 1120 may perform an authentication scheme with a selected mating key server, such as server $1130_1$, in order to establish a session key between the CA control system 1120 and the mating key server $1130_1$. Of course, the authentication scheme would be performed with the trusted third party if implemented in lieu of the mating key server $1130_1$. The session key can be used to encrypt information exchanged between the parties in order to provide a secure link there between. Examples of various types of authentication schemes include an exchange of digital certificates, digital signatures, hash values or the like.

Figure 11B:
FIG. 11B is an exemplary embodiment of a data structure forming the mating key generator transmitted through a secure content delivery system.

As shown in FIG. 11B, the mating key generator 1121 is a message that comprises one or more of the following: a Set-Top-Box Manufacturer identifier (STB Manufacturer ID) 1123, a Service Provider ID 1124, a conditional access (CA) Provider ID 1125 and a Mating Key Sequence Number 1226. For this embodiment, "STB manufacturer ID" 1123 is a predetermined value that identifies a manufacturer of the set-top box 1140. Of course, it is contemplated that the STB manufacturer ID 1123 is optional, depending on the particular arrangement of the STB Serial Num 1141. The "Service Provider ID" 1124 is a value (e.g., one or more bits such as 16-bits) that identifies the communications system provider as well as the selected distribution mechanism. For example, the Service Provider ID 1124 may identify which cable, satellite, terrestrial or Internet company is supplying the requested program data and/or the particular head-end server of that company. The "CA Provider ID" 1125 indicates the provider of the OA control system 1120. The "Mating Key Sequence Number" 1126 is used for reordering packets of information if the mating key 1122 is more than one packet in length, and in certain systems, may also be used to indicate expiration of the mating key generator 1121.

Referring back to FIG. 11A, the STB Serial Num. 1141 may have a unique portion for each STB Manufacturer ID 1123 in order to identify the mating key server $1130_1$, ... , or $1130_N$ (or database of trusted third party 1135) to which access is sought. Alternatively, the STB Serial Num 1141 may be expanded to include a serial number of the set-top box 1140 as well as a code field to identify the manufacturer of that set-top box 1140. Of course, the number of bits is a design choice.

Upon receipt of the mating key generator 1121 and STB Serial Num 1141, the appropriate mating key server (e.g., server $1130_1$, where i>1) returns the mating key 1122. In this embodiment, the mating key 1122 is used to encrypt a control word needed to descramble scrambled content being sent to the set-top box 1140. More specifically, the mating key server 1130$_i$ accesses a key being an identical copy of Unique Key 1180 pre-stored in server 1130$_i$ and encrypts the mating key generator 1121 using the accessed key. This produces a key equivalent to the mating key 1122. Alternatively, it is contemplated that the mating key generator 1121 may undergo a one-way hash operation in which the result is encrypted or a portion of message 1121 encrypted in lieu of the entire message 1121 being encrypted.

Upon receipt of the mating key 1122, the CA control system 1120 generates an entitlement management message (EMM) 1148 along with one or more ECMs 1142 sent to the smart card 1140. One embodiment of EMM 1148 is illustrated in FIG. 11C.

Figure 11C:
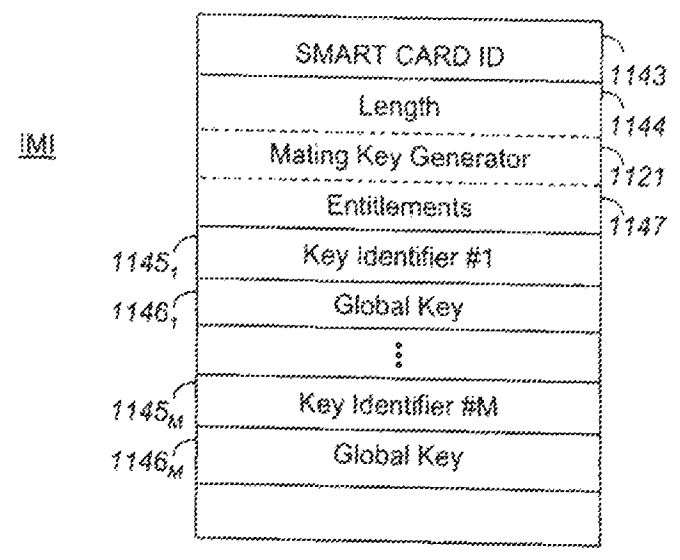

As shown in FIG. 11C, EMM 1148 comprises at least two of the following: Smart Card ID 1143, length field 1144, mating key generator 1121, "M" (M≥1) key identifiers 1145$_1$-1145$_M$ and global keys 1146$_1$-1146$_M$ associated with the key identifiers 1145$_1$-1145$_M$, respectively. Of course, other entitlements 1147 may be included in the EMM 1148. Also, it is contemplated that the mating key generator 1121 may be excluded from the EMM 1148 and sent separately and generally concurrent with the EMM 1148.

The Smart Card ID 1143 is a bit value that is used to indicate a particular set-top box and perhaps the manufacturer of the set-top box. The "EMM length field" 1144 is a bit value that is used to indicate the length of the EMM 1148. The mating key generator 1121, as shown, is a bit value that includes the parameters forth above in FIG. 11B. Each "key identifier" 1145$_1$-1145$_M$ is a 16-bit entitlement tag value that is signed for use in checking whether the global keys 1146$_1$-1146$_M$ have been illicitly altered. The global keys 1146$_1$-1146$_M$ are used to decrypt ECMs 1142 used to deliver access criteria requirements and at least one control word in an encrypted format. The size (in bits) of these values/fields can be varied.

Figure 12:
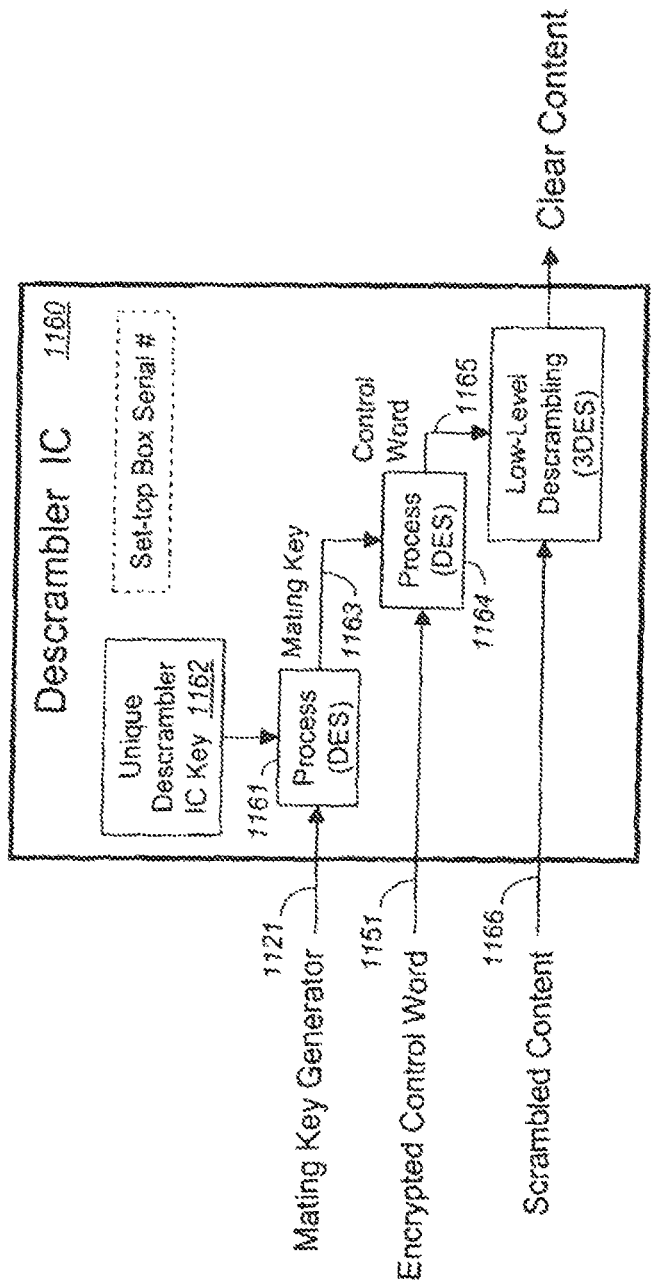
FIG. 12 is a first exemplary embodiment of a descrambler IC implemented, within the decoder of the set-top box of the system of FIG. 11A.

The smart card 1150 receives the EMM 1148 and forwards the mating key generator 1121 and an encrypted control word 1151 recovered from SCM 1142 to the descrambler IC 1160 of the set-top-box 1140 as described in FIG. 12.

FIG. 12 is a first exemplary embodiment of the descrambler IC 1160 implemented within the set-top box 1140 of FIG. 11A. On receipt of the mating key generator 1121 and the encrypted control word 1151 from the smart card 1150, the descrambler IC 1160 comprises a first process block 1161 that performs an encryption operation on the mating key generator 1121 using a unique key 1102 previously stored in the descrambler IC 1160. The encryption operation may be in accordance with symmetric key cryptographic functions such as DES, AES, IDEA, 3DES and the like. The "DES" operations are shown for illustrative purposes.

The encryption operation on the mating key generator 1121 produces a key 1163 identical to the mating key 1122, which is loaded into a second process block 1164 that is used to decrypt the encrypted control word 1151 to produce a control word 1165. The control word 1165 is used for descrambling the scrambled content 1166 loaded into the set-top box 1140 and in particular the descrambler IC 1160. Descrambling may include performance of 3DES operations on the scrambled content 1166. The result is content in a clear format, which may be transmitted from the descrambler IC 1160 and subsequently loaded into a MPEG decoder as shown in FIG. 8 or optionally into a D/A converter, DVI Interface or IEEE 1394 interface.

It is contemplated that process blocks 1161 and 1164 may be altered to support decryption and encryption respectively, depending on how the mating key 1122 is formulated.

Figure 13:
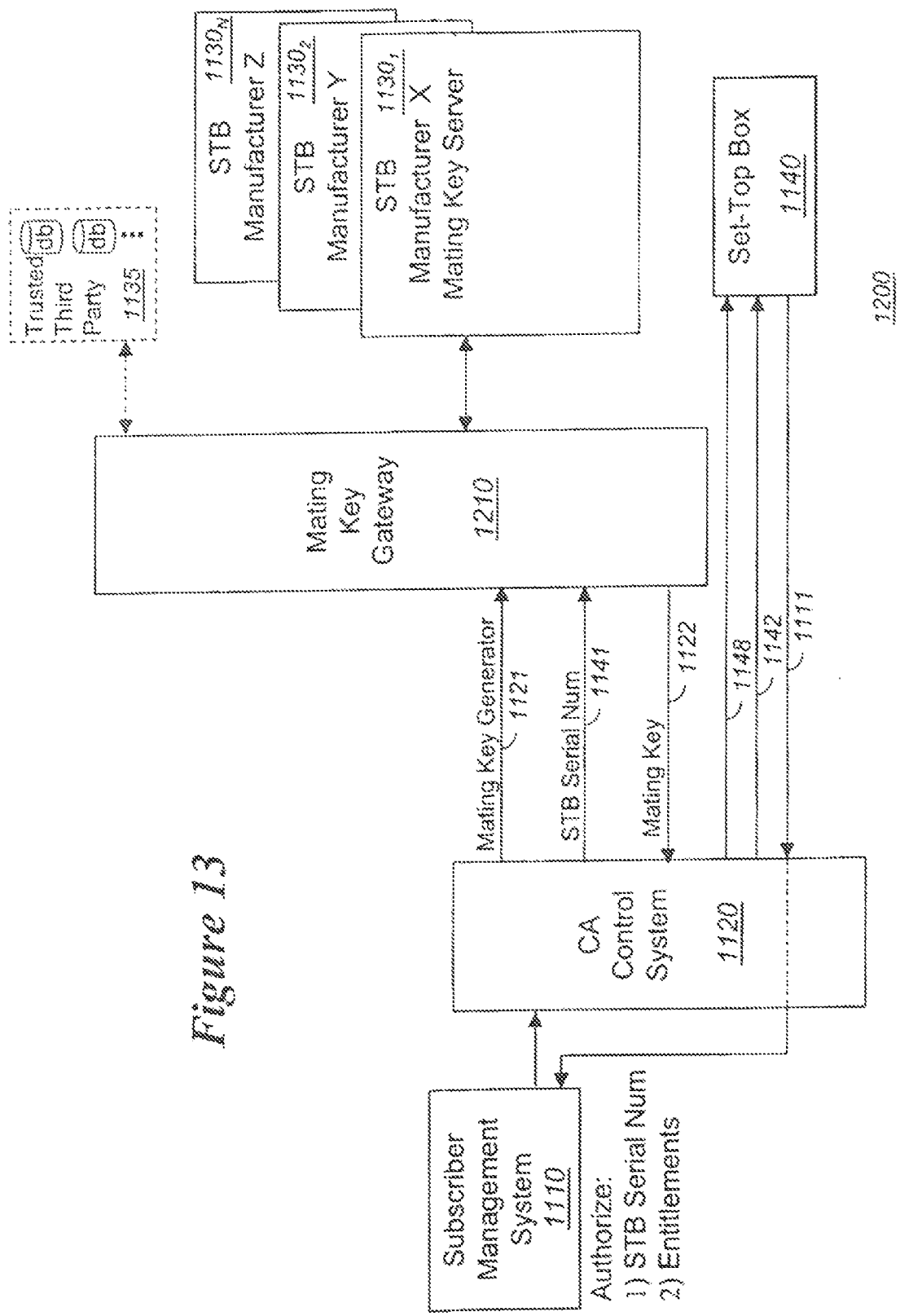
FIG. 13 is a fourth exemplary embodiment of a secure content delivery system.

Referring now to FIG. 13, a fourth exemplary embodiment of a secure content delivery system 1200 is shown. The secure content delivery system 1200 comprises the subscriber management system 1110, the CA control system 1120, a mating key gateway 1210, the mating key servers 1130$_1$-1130$_N$ and the set-top box 1140. In lieu of transmitting the mating key generator 1121 and STB Serial Num. 1141 from CA control system 1120 to one of a selected mating key servers 1130$_i$ as shown in FIG. 11A, such information may be routed to the mating key gateway 1210. The mating key gateway 1210 accesses the STB Manufacturer ID from the mating key generator 1121 and appropriately routes the mating key generator 1121 and STB Serial hum 1141 to a selected mating key server 1130$_i$. This reduces the amount of processing time by CA control system 1120 or servers 1130$_1$-1130$_N$ to recover the mating key 1122.

Alternatively, instead of mating key gateway 1210 routing the meting key generator 1121 and STB Serial Num 1141 to a selected, mating key server 1130-$_i$, it is contemplated that such information may be routed to the trusted third party 1133, which accesses a database for retrieval of a mating key. The mating key is based on values associated with the mating key generator 1121 and/or STB Serial Num 1141. Each database may be allocated a range of values where values associated within the mating key generator 1121 and/or the STB Serial Num 1141 can be used to identify a targeted database from which the mating key 1122 is accessed.

Figure 14A:
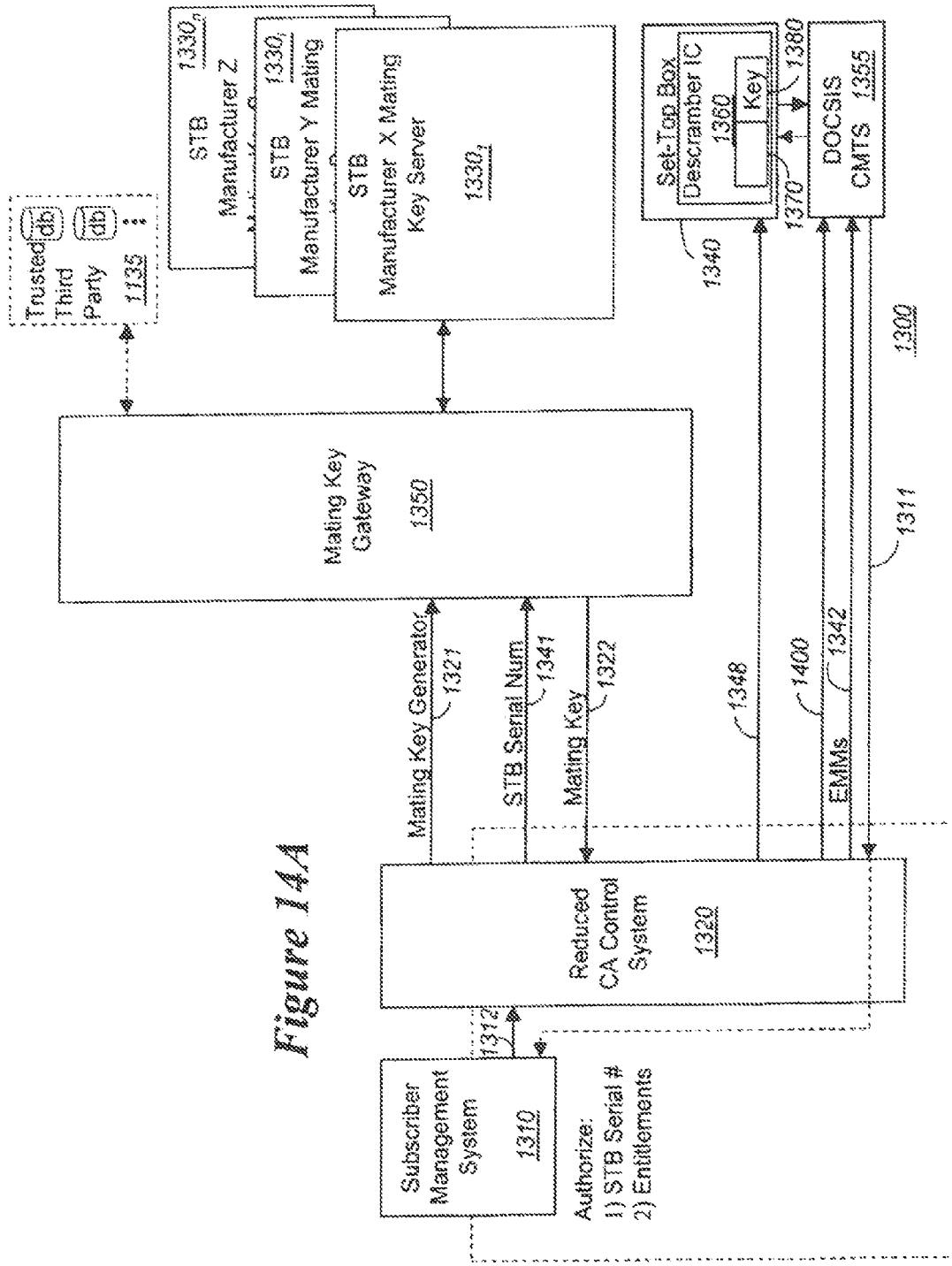
FIG. 14A is a fifth exemplary embodiment of a secure content delivery system.

FIG. 14A is a fifth exemplary embodiment of a secure content delivery system 1300. The secure content delivery system 1300 comprises a subscriber management system 1310 and a CA control system 1320, a plurality of mating key servers 1330$_1$-1330$_N$ associated with different set-top box manufacturers, a set-top box 1340, a mating key gateway 1350 (similar to gateway 1213), and a network interface 1355 (e.g., DOCSIS CMTS). The set-top box 1340 comprises a descrambler IC 1360 including local memory 1370 configured to store a unique key 1380 of the set-top box 1340.

Figure 15:
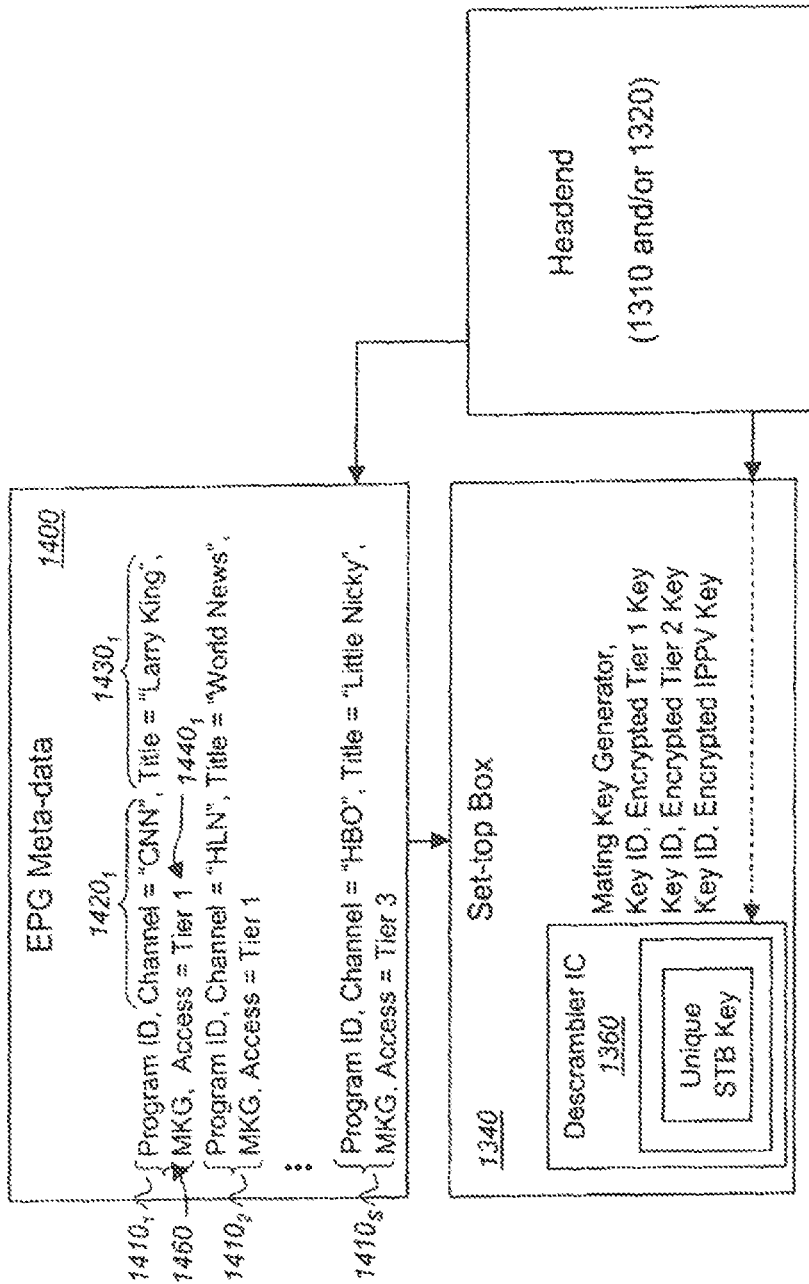
FIG. 15 is an exemplary embodiment of meta-data associated with an electronic program guide (EPG) routed to the set-top box of the system of FIG. 14A.

The set-top box 1340 received electronic program guide (EPG) meta-data with the CPC in an unscrambled format and digital content 1348 in a scrambled format. In one embodiment, the EPG meta-data 1400 is provided out-of-band by CA control system 1320. As shown in FIG. 15, one embodiment of the EPG meta-data 1400 includes multiple tag entries 1410$_1$-1410$_S$ (S≥1) for different types of content provided by a content provider. Each tag entry 1410$_i$ comprises at lease a channel name 1420, a name of the content 1430, and a key identifier 1440 indicating the tier of service associated with the channel. In addition, Each tag entry 1410$_j$ further comprises a program identifier (PID) 1450 and a mating key generator (MKG) 1460.

Referring back to FIG. 14A, once a user of the set-top box 1340 desires to receive particular type of content (e.g., PPV movie, broadcast channel, etc.), the set-top box 1340 determines whether entitlements associated with the requested content are already stored therein. If the entitlements are not stored, the user may be either (1) notified directly through a screen display or audio playback and prompted to provide a request 1311 to the subscriber management system 1310 (or CA control system 1320) or (2) the request 1311 may be sent automatically. The request 1311 may be provided our of band (e.g., telephone call or e-mail over Internet) or in-band (depression of order button on remote for transmission so subscriber management system 1310 via CA control system 1320).

Herein, the request 1311 may be a message that comprises a serial number of the set-top box (referred to as "STB Serial Num") and an identifier (e.g., an alphanumeric or numeric code) of the requested content. The subscriber management system 1310 processes the request 1311 and determines what entitlements are to be provided to the set-top box 1340.

Upon receiving an authorization (AUTH) message 1312 from the subscriber management system 1310, including the STB Serial Num 1341 and entitlements (or looking up STB Serial Num 1341 an Ca control system 1320), the CA control system 1320 routes the STB Serial Num 1341 and a mating key generator 1321 to the mating key gateway 1350. The mating key gateway 1350 operates as an intermediary to coordinate delivery of a mating key 1322 that is used to extract the requested content from downloaded, scrambled, information. As described previously, CA control system 1320 may be implemented as a headend server, a broadcast station, a satellite uplink or the like.

Prior to transmission of the STB Serial Num 1341 and the mating key generator 1321, elements of these messages described in FIGS. 11A-11C above, the CA control system 1320 may perform an authentication scheme with the mating key gateway 1350 in order to establish a session key to enable secure communications between them.

Upon receipt of the mating key 1322, the CA control system 1320 generates one or more entitlement management message (EMMs) 1342. One embodiment of an EMM 1342 is illustrated in FIG. 14B.

As shown in FIG. 14B, EMM 1342 comprises at least two of the following: STB Serial Num 1341, EMM length field 1343, mating key generator 1321, "M" (M≥1) key identifiers $1344_1$-$1344_M$ and encrypted service keys $1345_1$-$1345_M$ associated with the key identifiers $1344_1$- $1344_M$, respectively. Of course, the size (in bits) of these values can be varied and other types of entitlements 1346 besides identifiers or service keys may be included in the EMM 1342. Also, it is contemplated that the mating key generator 1321 may be excluded from the EMM 1342 and sent separately and generally concurrent with the EMM 1342. Of course, the size (in bits) of these values/fields can be varied.

The STB Serial Num 1341 is a value that is used to indicate a particular set-top box and perhaps the manufacturer of the set-top box. The "EMM length field" 1343 is a bit value that is used to indicate the length of the EMM 1342. The mating key generator 1321, as shown, is a bit value that includes the parameters forth above in FIG. 11B. Each "key identifier" $1344_1$-$1344_M$ is a 16-bit value that indicates a tier of service associated with a corresponding encrypted service key $1345_1$-$1345_M$, respectively. The encrypted service keys $1345_1$-$1345_M$ are decrypted by a key produced within the descrambler IC 1360 that is identical to the mating key 1322 as shown in FIG. 16.

Figure 16:
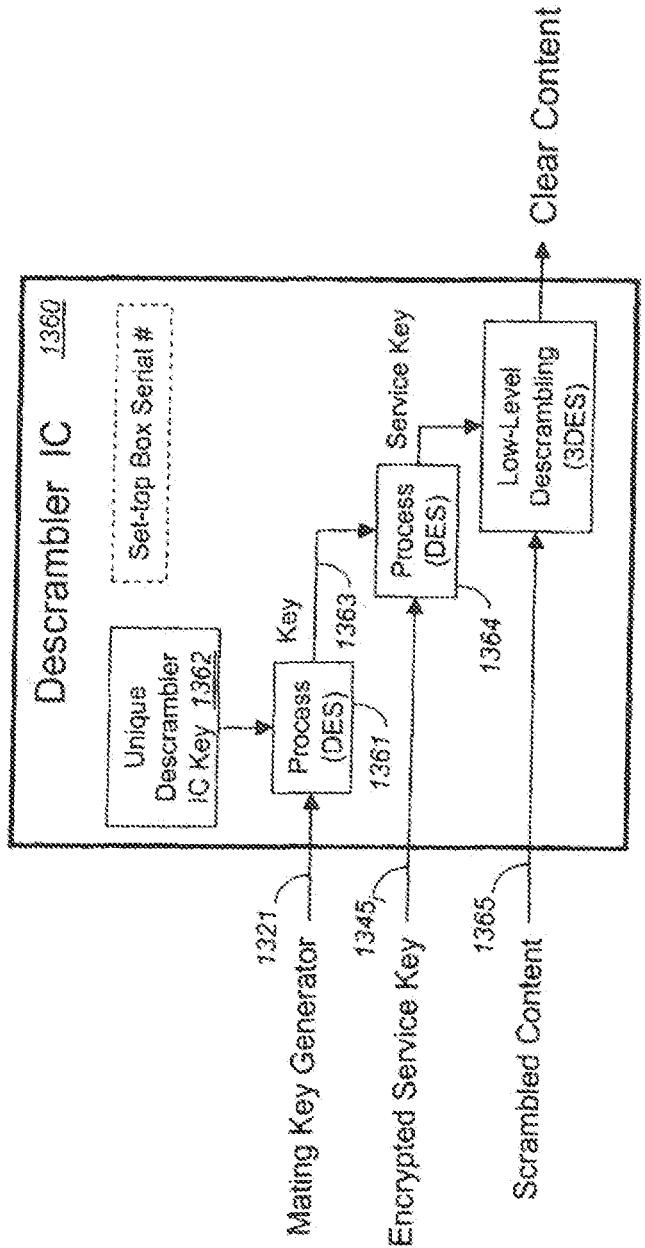
FIG. 16 is a first exemplary embodiment of the descrambler IC implemented within the set-top box of FIG. 14A.

FIG. 16 is a first exemplary embodiment of the descrambler IC 1360 implemented within the set-top box 1340 of FIG. 14A. On receipt of the mating key generator 1321 and the encrypted service keys $1345_j$ (1≤j≤M) included in the EMM 1342, the descrambler IC 1360 comprises a first process block 1361 that performs an encryption operation on the mating key generator 1321 using a unique key 1362 previously stored in the descrambler IC 1360. The encryption operation may be in accordance with symmetric key cryptographic functions such as DES, AES, IDEA, 3DES and the like. Of course, it is contemplated that block 1361 may be altered to perform a bashing function in lieu of an encryption function.

The encryption operation on the mating key generator 1321 produces a key 1363 identical to the mating key 1322, which is loaded into a second process block 1364 that is used to decrypt the encrypted service key 1343 to recover the service key used to descramble the scrambled content 1365 loaded into the set-top box 1340 and in particular the descrambler IC 1360. Descrambling may include performance of 3DES operations on the scrambled content. The result may be content in a clear format, which is transmitted from the descrambler IC 1360 and subsequently loaded into a MPEG decoder as shown in FIG. 8 or optionally into a D/A converter, DVI Interface or IEEE 1394 interface.

Figure 17:
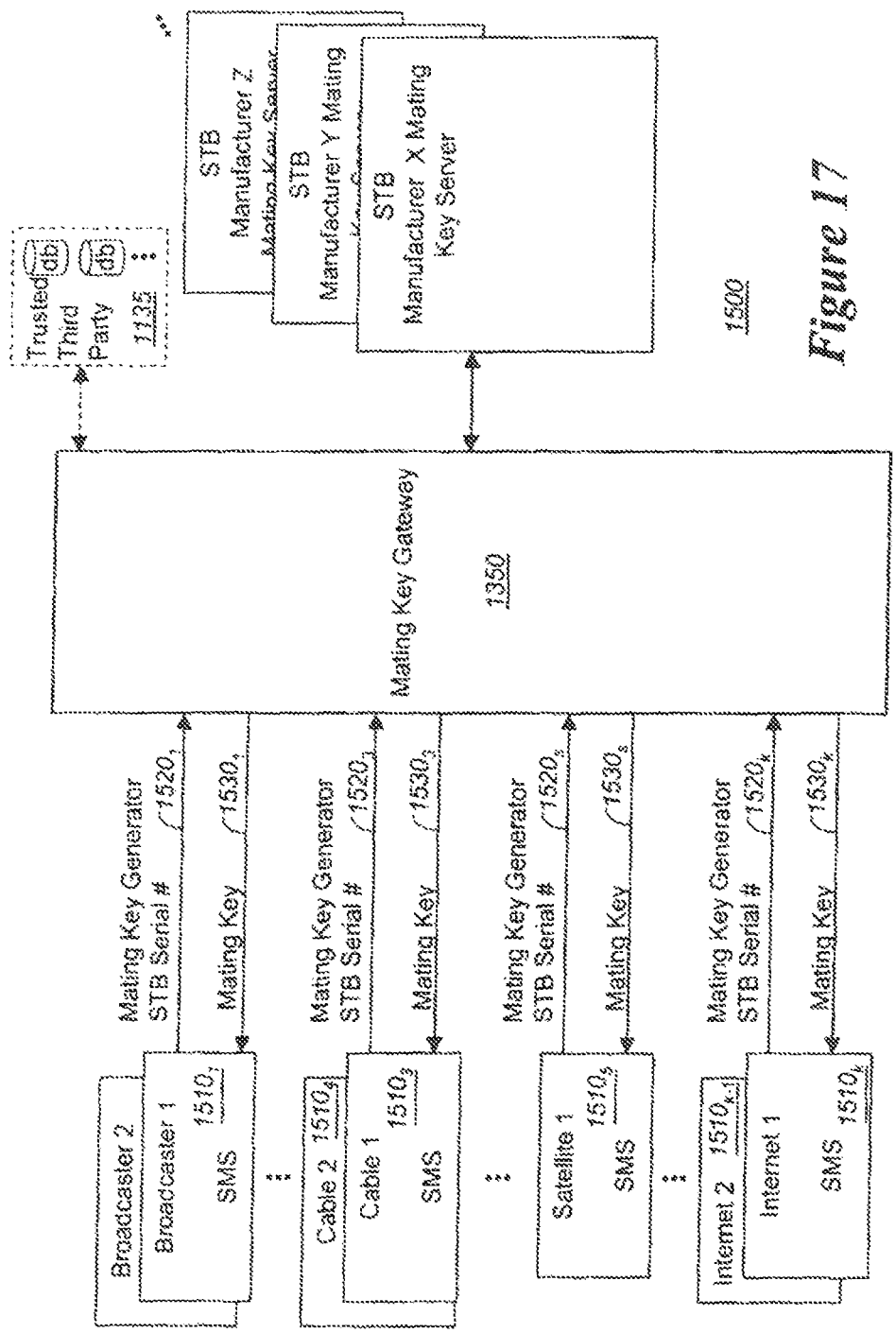
FIG. 17 is a portion of a sixth exemplary embodiment of a secure content delivery system.

Referring now to FIG. 17, a portion of a sixth exemplary embodiment of a secure content delivery system 1500 is shown. In lieu of the subscriber management system 1310 and the CA control system 1320 of FIG. 14A, mating key gateway 1350 may be adapted for communications with a plurality of subscriber management systems (SMS) $1510_1$-$1510_K$ (K≥1) each associated with a different content provider. Each of these subscriber management systems $1510_1$-$1510_K$ supply mating key generators and STB Serial Nums $1520_1$-$1520_K$ to mating key gateway 1350 and, in return, receive corresponding mating keys $1530_1$-$1530_K$. These mating keys $1530_1$-$1530_K$ are used to encrypt service keys provided to one or more targeted set-top boxes (not shown). Alternatively, the trusted third party 1135 may be utilized as shown in FIGS. 11A, 13 and 14.

For example, for this illustrated embodiment, subscriber management systems $1510_1$ and $1510_2$ are terrestrial broadcasters, each providing mating key generators and STB Serial Nums $1520_1$, $1520_2$ to mating key gateway 1350 and receiving corresponding mating keys $1530_1$, $1530_2$. Similar in operation, subscriber management systems $1510_3$ and $1510_4$ are cable operators, subscriber management system $1510_5$ is a direct broadcast satellite (DBS) company, and subscriber management systems $1510_{K\ 1}$ and $1510_K$ are Internet content sources.

Referring to FIG. 18, a portion of a seventh exemplary embodiment, of a secure content delivery system 1600 is shown. A set-top box 1610 of the system 1600 receives scrambled or encrypted content 1620 from a first source and an entitlement management message (EMM) 1640 from a second source. The second source may be a smart card or a CA control system.

In accordance with one embodiment of the invention, the EMM 1640 comprises a user key generator 1642 and an encrypted user key 1641. As shown in FIGS. 18 and 19, the encrypted user key 1641 is a value that, is calculated to generate a particular valve in the descrambler IC 1630 when it is decrypted by a unique key 1631 or a derivative thereof. It is a particular value in order for it to be shared. After payment, and CA descrambling, the content can be rescrambled using a copy protection key 1635, which is based on a user key 1633. The copy protection key 1635 is snared with other devices, such as another set ion box 1670, a portable computer (e.g., PDA) 1671, or even a portable jukebox 1672, for decryption purposes.

As further shown in FIG. 19, an embodiment of the descrambler IC 1630 receives the encrypted user key ($E_{key}$) 1641, the user key generator (UKG) 1642 and an encrypted control word 1643 from the second source. The descrambler IC 1630 comprises a first process block 1632 that decrypts $E_{key}$ 1641 with the Unique Key 1631 in accordance with symmetric key cryptographic functions such as DES, ACS, IDEA, 3DES and the like.

The decryption operation on $E_{key}$ 1641 recovers the user key 1633, which is loaded into a second process block 1634 that is used to encrypt UKG 1642 to produce the copy protection key 1635. The encrypted control word 1645 is decrypted using the unique key 1631 (or derivative thereof) to recover the control word is a clear format for descrambling and/or decrypting the encrypted content 1620 loaded into the set-top box 1610 and in. particular the descrambler IC 1530. Descrambling and/or decrypting may include performance of 3DES operations.

As a result, the content is temporarily placed in a clear format, but is routed to low-level encryption logic 1660, which encrypts the descrambled content with the copy protection key 1635 associated with any or ail of the destination digital devices. As a result, the content is secure during subsequent transmissions.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. An apparatus comprising;
at least one computer memory that is not a transitory signal and that comprises instructions executable by at least, one processor for:
sending an out-of-band request for encrypted control data to a headend;
receiving digital program data in a scrambled format by a descrambler integrated circuit;
receiving the encrypted control data by the descrambler integrated circuit;
decrypting the encrypted control data entirely within the descrambler integrated circuit using a multiple-step decryption process starting with a unique key permanently stored in the descrambler integrated circuit and using decryption of control data from a previous decryption step to generate a key to decrypt subsequent encrypted control data; and
descrambling the scrambled digital program data in the descrambler integrated circuit using the decrypted control data from the last decryption step.

2. The apparatus of claim 1, comprising the at least one processor.

3. The apparatus of claim 2, comprising the at least one processor controlling a display to present images represented by the digital program data, on the display.

4. An apparatus comprising:
at least one computer memory that is not a transitory signal and that comprises instructions executable by at least one processor for:
receiving digital program data in a scrambled format by a descrambler function in a decoder integrated circuit;
receiving encrypted control data by the descrambler function in a decoder integrated circuit, the encrypted control data being received over IP or being received out-of-band from one of: a head end, a server, a subscriber management system, a conditional access control system;
decrypting the encrypted control data entirely within the descrambler function in a decoder integrated circuit using a unique key permanently stored in the descrambler function in a decoder integrated circuit;
descrambling the scrambled digital program data in the descrambler function of a decoder integrated circuit using the decrypted control data; and
decoding the descrambled digital program data using the decoding function of a decoder integrated circuit.

5. The apparatus of claim 4, comprising the at least one processor.

6. The apparatus of claim 5, comprising the at least one processor controlling a display to present images represented by the digital program data on the display.

7. An apparatus comprising:
at least one computer memory that is not a transitory signal and that comprises instructions executable by at least one processor for:
sending an out-of-band request for encrypted control data to a subscriber management system or conditional access control system;
receiving digital program data in a scrambled format by a descrambler integrated circuit;
receiving the encrypted control data by the descrambler integrated circuit;
decrypting the encrypted control data entirely within the descrambler integrated circuit, using a multiple-step decryption process starling with a unique key permanently stored in the descrambler integrated circuit and using decryption of control data from a previous decryption step to generate a key to decrypt subsequent encrypted control data; and
descrambling the scrambled digital program data in the descrambler integrated circuit using the decrypted control data from the last decryption step.

8. The apparatus of claim 7, comprising the at least one processor.

9. The apparatus of claim 8. comprising the at least one processor controlling a display to present images represented by the digital program data on the display.

10. An apparatus comprising:
at least one computer memory that is not a transitory signal and that comprises instructions executable by at least one processor for:
sending a request for encrypted control data to a server using Internet Protocol (IP);
receiving digital program data in a scrambled format by a descrambler integrated circuit;
receiving encrypted control data by the descrambler integrated circuit;
decrypting the encrypted control data entirely within the descrambler integrated circuit using a unique key permanently stored in the descrambler integrated circuit; and
descrambling the scrambled digital program data in the descrambler integrated circuit using the decrypted control data.

11. The apparatus of claim 10, comprising the at least one processor.

12. The apparatus of claim 11, comprising the at least one processor controlling a display to present images represented by the digital program data on the display.

13. An apparatus comprising:
at least one computer memory that is not a transitory signal and that comprises instructions executable by at least one processor for:

sending a request for encrypted digital program data and encrypted control data to a server using internet Protocol (IP);

receiving digital program data in a scrambled format by a descrambler integrated circuit;

receiving the encrypted control data by the descrambler integrated, circuit;

decrypting the encrypted control data entirely within the descrambler integrated circuit using a multiple-step decryption process starting with a unique key permanently stored in the descrambler integrated circuit and using decryption of control data from a previous decryption step to generate a key to decrypt subsequent encrypted control data; and descrambling the scrambled digital program data in the descrambler integrated circuit using the decrypted control data of the last step.

14. The apparatus of claim 13, comprising the at least one processor.

15. The apparatus of claim 14, comprising the at least one processor controlling a display to present images represented by the digital program data on the display.

\* \* \* \* \*